(12) United States Patent
Frieder et al.

(10) Patent No.: US 12,093,303 B2
(45) Date of Patent: *Sep. 17, 2024

(54) METHOD OF DISPLAYING TWO ADJACENT PHOTOS ON A SPLIT SCREEN DIGITAL PICTURE FRAME

(71) Applicant: AURA HOME, INC., San Francisco, CA (US)

(72) Inventors: Ophir Frieder, Chevy Chase, MD (US); Abdur Chowdhury, San Francisco, CA (US); Eric Jensen, Brooklyn, NY (US); Ben Cherry, San Francisco, CA (US); Richard Sanford, Seattle, WA (US); Alek Kolcz, Issaquah, WA (US); Prooshat Saberi, San Francisco, CA (US)

(73) Assignee: AURA HOME, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,772

(22) Filed: Apr. 26, 2023

(65) Prior Publication Data

US 2023/0259546 A1 Aug. 17, 2023

Related U.S. Application Data

(63) Continuation of application No. 17/084,987, filed on Oct. 30, 2020, now Pat. No. 11,669,562, which is a
(Continued)

(51) Int. Cl.
*G06F 16/00* (2019.01)
*G06F 3/147* (2006.01)
(Continued)

(52) U.S. Cl.
CPC .......... *G06F 16/4393* (2019.01); *G06F 3/147* (2013.01); *G06F 16/23* (2019.01);
(Continued)

(58) Field of Classification Search
None
See application file for complete search history.

(56) References Cited

U.S. PATENT DOCUMENTS 8,212,834 B2 * 7/2012 Bogart .................... G06T 11/60
345/556
8,274,523 B2 * 9/2012 Ptucha .................... G06T 11/60
707/769

(Continued)

OTHER PUBLICATIONS

Hazas, M., et al., "Location-Aware Computing Comes of Age," Invisible Computing, Feb. 2004, pp. 95-97.
(Continued)

*Primary Examiner* — Farhan M Syed
(74) *Attorney, Agent, or Firm* — Pauley Erickson & Swanson

(57) ABSTRACT

A method and apparatus for displaying digital photos on a digital display with a network connection module. The method includes identifying two different photos in a digital photo collection that include a matching photo content, and displaying the two different photos simultaneously in a split screen on the digital display. The two different photos can be matched from related photo clusters. An integrated camera can be used to automatically determine an identity of a frame viewer to determine photos to display, and can capture gesture-based feedback. The photos can be filtered and cropped at the receiver side.

9 Claims, 6 Drawing Sheets

Related U.S. Application Data continuation-in-part of application No. 16/113,366, filed on Aug. 27, 2018, now Pat. No. 10,824,666, which is a continuation-in-part of application No. 15/824,337, filed on Nov. 28, 2017, now Pat. No. 10,820,293, which is a continuation-in-part of application No. 15/150,623, filed on May 10, 2016, now Pat. No. 10,474,407, which is a continuation-in-part of application No. 14/949,353, filed on Nov. 23, 2015, now Pat. No. 9,472,166, which is a continuation-in-part of application No. 14/455,297, filed on Aug. 8, 2014, now Pat. No. 9,420,015, which is a continuation-in-part of application No. 14/051,071, filed on Oct. 10, 2013, now Pat. No. 9,225,789, and a continuation-in-part of application No. 14/051,089, filed on Oct. 10, 2013, now Pat. No. 9,338,759.

(51) Int. Cl.

| | | |
|---|---|---|
| *G06F 16/23* | (2019.01) | |
| *G06F 16/438* | (2019.01) | |
| *G06F 16/55* | (2019.01) | |
| *G06V 10/762* | (2022.01) | |
| *G06V 20/30* | (2022.01) | |
| *G06V 40/16* | (2022.01) | |
| G06F 18/2113 | (2023.01) | |
| G06F 18/22 | (2023.01) | |
| G06F 18/23 | (2023.01) | |
| H04L 67/141 | (2022.01) | |

(52) U.S. Cl.
CPC ............ *G06F 16/55* (2019.01); *G06V 10/762* (2022.01); *G06V 10/7635* (2022.01); *G06V 20/30* (2022.01); *G06V 40/161* (2022.01); *G06V 40/168* (2022.01); *G06V 40/172* (2022.01); *G06F 18/2113* (2023.01); *G06F 18/22* (2023.01); *G06F 18/23* (2023.01); *H04L 67/141* (2013.01)

(56) References Cited

U.S. PATENT DOCUMENTS

| | | | |
|---|---|---|---|
| 8,289,340 B2* | 10/2012 | Ptucha | G06T 11/60 707/769 |
| 8,359,642 B1 | 1/2013 | Wurtenberger et al. | |
| 8,392,957 B2 | 3/2013 | Holt et al. | |
| 8,633,853 B2 | 1/2014 | Amidi | |
| 8,983,210 B2* | 3/2015 | Krupka | G06F 16/583 382/118 |
| 9,225,789 B2 | 12/2015 | Jensen et al. | |
| 9,288,616 B2 | 3/2016 | Cherry et al. | |
| 9,313,399 B2 | 4/2016 | Morley | |
| 9,338,242 B1 | 5/2016 | Suchland et al. | |
| 9,338,759 B2 | 5/2016 | Chowdhury et al. | |
| 10,719,744 B2* | 7/2020 | Smith | G06V 30/274 |
| 2005/0015452 A1 | 1/2005 | Corson | |
| 2008/0201638 A1 | 8/2008 | Nair | |
| 2008/0298690 A1 | 12/2008 | Oh et al. | |
| 2009/0240586 A1 | 9/2009 | Ramer et al. | |
| 2009/0286549 A1 | 11/2009 | Canon | |
| 2009/0310028 A1 | 12/2009 | Sadri et al. | |
| 2010/0030612 A1 | 2/2010 | Kim et al. | |
| 2010/0082398 A1 | 4/2010 | Davis et al. | |
| 2010/0130233 A1 | 5/2010 | Parker | |
| 2010/0280904 A1 | 11/2010 | Ahuja | |
| 2010/0293105 A1 | 11/2010 | Blinn et al. | |
| 2010/0298899 A1 | 11/2010 | Donnelly et al. | |
| 2010/0332324 A1 | 12/2010 | Khosravy et al. | |
| 2010/0332326 A1 | 12/2010 | Ishai | |
| 2011/0029359 A1 | 2/2011 | Roeding et al. | |
| 2011/0029370 A1 | 2/2011 | Roeding et al. | |
| 2011/0161427 A1 | 6/2011 | Fortin et al. | |
| 2011/0178863 A1 | 7/2011 | Daigle | |
| 2011/0179064 A1 | 7/2011 | Russo | |
| 2011/0211764 A1* | 9/2011 | Krupka | G06V 20/30 382/225 |
| 2011/0238755 A1 | 9/2011 | Khan et al. | |
| 2011/0309946 A1 | 12/2011 | Johnson et al. | |
| 2012/0047129 A1 | 2/2012 | Redstone | |
| 2012/0089679 A1 | 4/2012 | Gold | |
| 2012/0140096 A1 | 6/2012 | Östlund et al. | |
| 2012/0158845 A1 | 6/2012 | Baalu et al. | |
| 2012/0179563 A1 | 7/2012 | Soroca et al. | |
| 2012/0203799 A1* | 8/2012 | Blanchflower | H04N 21/4532 707/784 |
| 2012/0215637 A1 | 8/2012 | Hermann | |
| 2012/0265841 A1 | 10/2012 | Ross et al. | |
| 2012/0270611 A1 | 10/2012 | Choi | |
| 2012/0278387 A1 | 11/2012 | Garcia et al. | |
| 2012/0290389 A1 | 11/2012 | Greenough et al. | |
| 2012/0302258 A1 | 11/2012 | Pai et al. | |
| 2012/0309376 A1 | 12/2012 | Huang | |
| 2013/0013683 A1 | 1/2013 | Elliott | |
| 2013/0013700 A1 | 1/2013 | Sittig et al. | |
| 2013/0060640 A1 | 3/2013 | Gadhia et al. | |
| 2013/0066964 A1 | 3/2013 | Odio et al. | |
| 2013/0073622 A1 | 3/2013 | Nguyen et al. | |
| 2013/0077835 A1 | 3/2013 | Kritt et al. | |
| 2013/0085861 A1 | 4/2013 | Dunlap | |
| 2013/0091213 A1 | 4/2013 | Diab et al. | |
| 2013/0103757 A1 | 4/2013 | Mitchell et al. | |
| 2013/0117109 A1 | 5/2013 | Busch | |
| 2013/0148864 A1 | 6/2013 | Dolson et al. | |
| 2013/0166386 A1 | 6/2013 | Simmons | |
| 2013/0191215 A1 | 6/2013 | Metcalf | |
| 2013/0194438 A1 | 8/2013 | Sweet, III et al. | |
| 2013/0203440 A1 | 8/2013 | Bilange et al. | |
| 2013/0276029 A1 | 10/2013 | Li et al. | |
| 2013/0286223 A1 | 10/2013 | Latta et al. | |
| 2013/0303106 A1 | 11/2013 | Martin | |
| 2014/0003716 A1 | 1/2014 | Fedorovskaya et al. | |
| 2014/0086458 A1 | 3/2014 | Rogers | |
| 2014/0108526 A1 | 4/2014 | Garcia-Barrio et al. | |
| 2014/0149427 A1* | 5/2014 | Wilder | G06F 16/44 707/748 |
| 2014/0173602 A1 | 6/2014 | Kikin-Gil et al. | |
| 2014/0280120 A1* | 9/2014 | Sharp | G06F 16/335 707/732 |
| 2014/0280121 A1* | 9/2014 | Sharp | G06F 16/14 707/732 |
| 2014/0317101 A1* | 10/2014 | Myslinski | G06F 16/95 707/723 |
| 2014/0333432 A1 | 11/2014 | Armitage | |
| 2014/0337346 A1* | 11/2014 | Barthel | G06F 16/176 707/738 |
| 2015/0058345 A1 | 2/2015 | Mishra et al. | |
| 2015/0074721 A1 | 3/2015 | Fishman et al. | |
| 2015/0106448 A1 | 4/2015 | Ownbey et al. | |
| 2015/0106449 A1 | 4/2015 | Cherry et al. | |
| 2015/0373493 A1 | 12/2015 | Chowdhury et al. | |
| 2016/0066864 A1 | 3/2016 | Frieder et al. | |
| 2016/0128618 A1 | 5/2016 | Lee | |
| 2016/0140934 A1 | 5/2016 | Frieder et al. | |
| 2016/0164813 A1 | 6/2016 | Anderson et al. | |
| 2016/0183048 A1 | 6/2016 | Cherry et al. | |
| 2016/0255162 A1 | 9/2016 | Frieder et al. | |
| 2016/0371534 A1 | 12/2016 | Koul et al. | |
| 2018/0146447 A1 | 5/2018 | Frieder et al. | |
| 2018/0150986 A1 | 5/2018 | Frieder et al. | |
| 2019/0042171 A1* | 2/2019 | Frieder | H04L 67/535 |
| 2019/0042867 A1* | 2/2019 | Chen | H04L 9/3239 |
| 2019/0042870 A1* | 2/2019 | Chen | G06F 9/5072 |
| 2019/0042900 A1* | 2/2019 | Smith | G06V 10/96 |
| 2019/0043201 A1* | 2/2019 | Strong | G06V 10/96 |
| 2019/0044703 A1* | 2/2019 | Smith | G06V 40/161 |
| 2019/0045207 A1* | 2/2019 | Chen | G06N 3/045 |
| 2019/0050403 A1 | 2/2019 | Frieder et al. | |
| 2019/0113973 A1* | 4/2019 | Coleman | G06F 3/011 |

(56) References Cited

U.S. PATENT DOCUMENTS

2019/0244127 A1* 8/2019 Amado ................ A63F 9/24
2021/0048965 A1 2/2021 Frieder et al.

OTHER PUBLICATIONS

Chen, G., et al., "A Survey of Context-Aware Mobile Computing Research," Dartmouth Computer Science Technical Report TR2000-381, (2000), 16 pages.
Bahl, P., et al., "Radar: an In-Building RF-based User Location and Tracking System," IEEE INFOCOM (2000), vol. 2, pp. 775-784.
Kennedy, M., et al., "Adaptive Energy Optimization in Multimedia-centric Wireless Devices: a Survey," IEEE Communication Surveys and Tutorials (COMST), (2012), 19 pages.
Wang, C., et al., "Simultaneous Localization, Mapping and Moving Object Tracking," International Journal of Robotics Research (2004), 47 pages.
Krumm, J., et al., "LOCADIO: Inferring Motion and Location from Wi-Fi Signal Strengths," Mobiquitous Conference, Boston, MA, (2004) Aug. 22-26, pp. 4-13.
Perrucci, G. P., et al., "On the Impact of 2G and 3G Network Usage for Mobile Phones' Battery Life," European Wireless Conference (2009), May 17-20, pp. 255-259.
Amazon.com, Samsung tablet 2013 model with camera.
Wideupdates.com, WaybackMachine, 19, Nov. 2013, Dayframe, pp. 2-4.
Digikey.com, Christopher J. Fisher, Digikey Electronics, May 6, 2011, p. 1.

* cited by examiner

METHOD OF DISPLAYING TWO ADJACENT PHOTOS ON A SPLIT SCREEN DIGITAL PICTURE FRAME

CROSS REFERENCE TO RELATED APPLICATIONS

This application is a continuation of U.S. patent application Ser. No. 17/084,987, filed on 30 Oct. 2020, which is a continuation-in-part of U.S. patent application Ser. No. 16/113,366, filed on 27 Aug. 2018, which is a continuation-in-part of U.S. patent application Ser. No. 15/824,337, filed on 28 Nov. 2017, which is a continuation-in-part of U.S. patent application Ser. No. 15/150,623, filed on 10 May 2016, which is a continuation-in-part of U.S. patent application Ser. No. 14/949,353, filed on 23 Nov. 2015, which is a continuation-in-part of U.S. patent application Ser. No. 14/455,297, filed on 8 Aug. 2014, which is a continuation-in-part of each of: U.S. patent application Ser. No. 14/051,071, filed on 10 Oct. 2013, and U.S. patent application Ser. No. 14/051,089, filed on 10 Oct. 2013. The parent application(s) are hereby incorporated by reference herein in their entirety and are made a part hereof, including but not limited to those portions which specifically appear hereinafter.

FIELD OF THE INVENTION

This invention relates generally to a digital picture frame and, more particularly, to a digital picture frame that automatically provides personalized photo viewing, such as with two photos on a split screen, in automated combination with a proximate or remote electronic device and/or a Mobile Positional Social Media (MPSM) account.

BACKGROUND OF THE INVENTION

Existing digital picture frames synchronize with popular social media platforms, such as Facebook™ and Instagram™, using, among other techniques, a WiFi™ interconnection. However, multiple steps may be required for such synchronization. These manual steps can be difficult to do if one wants to change to a different social media account or to directly retrieve from a picture capture or storage device, such as while entertaining guests. There is a continuing need for improvements for implementing displays such as home digital picture frames.

SUMMARY OF THE INVENTION

The present invention provides a digital picture frame that automatically detects viewers and/or viewers' electronic devices, and automatically displays photos or videos relevant to the detected viewers. The relevant photos or videos are obtained upon detection from the electronic device and/or social media accounts of the detected viewers. The photos or videos can also be automatically obtained from devices, frames, stored photo collections, or social media accounts of one or more community members of the detected viewer(s), such as photos taken and posted by a friend or relative of the detected viewer. The device and method of this invention provides for improved and updated photo display based upon current photos and/or social media updates, and thus relevant to the viewer. The device of this invention can be used as an MPSM device to display any MPSM information, as desired, including but not limited to MPSM information obtained according to methods described herein.

A general object of the invention can be attained, at least in part, through a digital picture frame including a digital display mounted within a frame, a camera connected to the frame, a network connection module adapted to connect to an electronic device, photo collection, and/or social media account of a viewer viewing the digital picture frame and to receive photos stored within the electronic device and/or the social media account, and an automated display module adapted to automatically change photos displayed on the digital display to photos from the electronic device and/or social media account of the viewer, such as upon automatic detection with the camera of the viewer.

Embodiments of the invention include a method of displaying digital photos on a digital display with a network connection module, comprising: identifying two different photos in a digital photo collection that include a matching photo content; and displaying the two different photos simultaneously in a split screen (digitally created) on the digital display. The split screen desirably includes two equal sections of the digital display. A first of the two different photos is in, or forms, a first of the two equal sections, and a second of the two different photos is in, or forms, a second of the two equal sections.

The matching photo content can be a same person or a same combination of persons. The two different photos can be photographically captured in two different calendar years, wherein the two different calendar years are separated by a time period, such as more than one additional calendar year. The matching photo content can be a same person and each of the two different photos further include one of two different second persons, for example, wherein the different second persons are related family members (e.g., 1: Jane with mon and 2: Jane with dad). The two different photos can be automatically downloaded from one or more digital photo collections of one person or two different second persons.

The invention further includes a method and device for displaying photos on a digital picture frame that includes: automatically clustering photos of one or more digital photo collections for display to the viewer, and automatically displaying on the digital display the photos from the digital photo collection as a function of the clustering. The clusters are groups of photos to form photo collections of related content, such as selected from people, things, places, activities, or combinations thereof, and displaying the photo collections. The photos are desirably clustered by a photo content, which can be identified or confirmed by photo metadata. Clustering of photos with a preselected photographed person can be performed by automatically identifying and clustering the photographed person by facial features. Clustering according to this invention is particularly useful for photos taken over a multi-year timeframe, and grouping photos by related photo content across the timeframe.

Embodiments of this invention further include automatically clustering digital photos of the digital photo collection according to a content, and automatically selecting the two different photos for the split screen display as a function of the clustering. The two different photos can be selected from a same or two different photo clusters. In some embodiments, the invention includes scanning digital photos for content, automatically creating a plurality of photo clusters of the digital photos for display from the digital photo collection, wherein each of the photo clusters is based upon a different cluster content, and selecting the two different photos from at least one of the photo clusters.

Embodiments of this invention include downloading a first interaction application to a first electronic device of a first user, the first electronic device including a first digital photo collection, and downloading a second interaction application to a second electronic device of a user community member, the second electronic device including a second digital photo collection of the user community member. Each interaction application automatically clusters digital photos of the corresponding digital photo collection according to content. Selected or all photo clusters are provided to the device for display. The two different photos can come from the first and/or the second selected digital photo clusters. For example, a first of the two different photos can be from the first selected digital photo and a second of the two different photos can be from the second selected digital photo cluster.

In embodiments of this invention, the clustering includes preparing a plurality of sub-clusters, each for a common detected content in the photos selected from things, places, activities, or combinations thereof, wherein each of the plurality of sub-clusters is formed of the common detected content at a similar time and/or age. Related sub-clusters of the common detected content are linked together to form a cluster of related common detected content for display as a function of one or more predetermined features having limited change over a timeframe. The first of the two different photos for the split screen can be selected from a first of the sub-clusters and a second of the two different photos from the second of the sub-clusters. For clustering, the method desirably operates by extracting photo features of the common detected content within each of the sub-clusters of photos to form cluster representations, wherein the photo features are predetermined as having the limited change over a timeframe, comparing the cluster representations between sub-clusters to determine the related sub-clusters, and linking or grouping the related sub-clusters for display as a function of matching cluster representations.

The invention further includes automatically clustering from the digital photo collection, via automated facial recognition, photos over a multi-year timeframe of a person to obtain clustered photos of the person. The clustering includes: preparing a plurality of sub-clusters each including digital photos of the person at a similar time and/or age; extracting photo facial features within each of the plurality of sub-clusters that comprise a predetermined limited change over the timeframe to form a cluster representation of the person for each of the plurality of sub-clusters; comparing cluster representations between the plurality of sub-clusters to determine related sub-clusters of the person over the timeframe as a function of the cluster representations; and linking or grouping related sub-clusters to form the clustered photos of the person for display. A first of the two different photos can be selected from a first of the sub-clusters and a second of the two different photos from the second of the sub-clusters.

The invention includes a method of displaying photos on electronic devices with a network connection, including: automatically obtaining a digital photo from a first electronic device; automatically identifying a content of the digital photo; automatically identifying a target display electronic device as a function of the content; and automatically routing the digital photo over the network connection to the target display electronic device for display. The first electronic device is controlled by a first community member and the target display device, such as a mobile device or a digital picture frame, can be controlled by a second community member. The target display electronic device desirably includes predetermined content constraints, and the digital photo is routed and/or displayed if the photo meets the content constraints.

The invention further includes a method of displaying photos on electronic devices with a network connection via: automatically obtaining digital photos on a first electronic device; automatically identifying a content of each of the digital photos; automatically matching the content of a first of the digital photos to a predetermined content constraint of a second electronic device; and automatically routing the first of the digital photos to the second electronic device over the network connection for display on the second electronic device. The method can further include automatically processing the digital photos by at least one of image enhancement, content filtering, and/or repetition filtering. The content filtering can include identifying the place, person, and/or activity, etc. of the photo, which can then be compared to preferred content (e.g., a stored metadata identification set) of the potential target/receiving frames.

In presently preferred embodiments of this invention, where the content of the first of the digital photos matches a predetermined content constraint of a plurality of community members, the first of the digital photos is automatically routed to electronic devices of each of the matching community members. The invention further includes a method of displaying photos on electronic devices with a network connection, including: automatically obtaining digital photos on a first electronic device; automatically identifying a content of each of the digital photos; automatically matching the content of each of a plurality of the digital photos to a predetermined content constraint of a corresponding electronic device of one or more community members; and automatically routing each of the plurality of digital photos to the corresponding electronic device as a function of the matching for display on the corresponding electronic device.

The invention further comprehends a method of displaying photos on a digital picture frame including a digital display mounted within a frame, a camera connected to the frame, and a network connection module. The method includes: automatically determining with the camera an identity of a viewer of the digital picture frame; automatically determining a viewer profile from the identity of the viewer; and automatically changing photos shown on the digital display as a function of the viewer profile upon detection of the viewer with the camera. The method can include automatically augmenting a photo display on the digital display as a function of photo metadata and the viewer profile. In embodiments of this invention, the viewer profile is automatically learned and uploaded via an electronic device and/or a social media account of the viewer.

The invention further comprehends a method of displaying photos on a digital picture frame including a digital display mounted within a frame, a camera connected to the frame, and a network connection module. The method includes automatically determining with the camera an identity of a viewer of the digital picture frame, automatically connecting to a picture capture or storage electronic device of the viewer over a network, such as a WiFi network, and automatically displaying photos shown on the digital display obtained from the electronic device over the network connection.

The device and method of this invention can automatically display a slideshow of photos relevant to one or more display viewers as a function of photo context selected from time taken, photo location, and/or photo content. The device can automatically access, using the network module, at least one electronic device, digital photo collection, and/or social media account of: the viewer and/or at least one social media community member of the viewer. Photos from the one or more electronic devices, photo collections, or social media accounts are desirably automatically loaded and displayed. In embodiments of this invention, obtained photos are automatically sequenced on the digital display as a function of profiling traits selected from chronological order, photo location, photo activity, and/or community member.

The device and method can detect and recognize two or more different and simultaneous, or otherwise present, persons viewing the digital picture frame, and automatically change the photos displayed on the digital display to photos uploaded from an electronic device and/or a social media account of each of two or more persons viewing the digital picture frame. The photos from the electronic device or social media account of each of the two or more persons can include shared activity photos from activities shared by the two or more persons. The invention includes embodiments where a server computer automatically determines shared activity photos from the electronic device and/or social media account of the each of the two or more persons as a function of context information automatically associated with the shared activity photos by the same or different server computer. The context information of each of the shared activity photos can include, but is not limited to, a photo location, a photo activity, and/or a present community member.

The invention still further comprises a display device with one or more of: automatic detection for configuration, namely the self-straightening or self-positioning on a vertical (e.g., wall) and/or a horizontal (e.g., table) platform; the automatic detection of viewing conditions, namely, based on the distance of the viewer, enlarging or contracting the picture; based on the lighting, increasing or decreasing the lighting intensity. The invention also comprises a display device that: via face recognition, automatically detects the viewer and targets the photos for her or him based on their potentially learned profile; via the automatic identification and tagging of the location, activity, and community member involvement on a per photo or video, indicating the with whom, where, when and what was being done when the picture was taken as well as any other associated metadata; and/or providing a "story telling" capability. By storytelling, chronological stories, optionally simultaneously displayed on a split screen, are grouped by: purely time, namely in sequential or reverse chronological ordering; location, namely a traversal of sites on a location based trip; activity, namely in chronological ordering of a given or similar set of activities; community member involvement, namely a pictorial interaction with community members, potentially segmented by particular community member or members; or any other profiling traits of a recognized user that can be used to cluster or segment photos or videos for automatic story telling.

The invention includes a method of displaying photos on a digital picture frame and including: automatically determining with the camera an identity of a viewer of the digital picture frame; automatically connecting to one or more digital photo collections over a network; and automatically displaying on the digital display photos obtained from the digital photo collection over the network connection. The digital photo collection(s) can be associated with a second digital picture frame and/or an electronic device of a community member of the viewer. The digital picture frame has access to the digital photo collection(s) and a server computer automatically sends the photos to the frame through the network connection module. The server or frame desirably automatically crops and aligns the photos to fit the digital display, such as by automatically scaling and realigning the photos to an aspect ratio of the digital display.

Additional automated processing can include image enhancement, content filtering, or repetition filtering. The photos can be filtered by image quality and content quality. The digital picture frame can include a content restriction filter module including adjustable content restraints controlled by a frame administrator, for implementing content restrictions of the viewer obtained from a viewer profile over the network. The frame administrator and/or the viewer can have or set pre-established filtering parameters selected from image quality and/or content quality, for use in filtering the digital photo collection.

In embodiments of this invention, the device and method include automatically detecting via the camera a physical response to one of the displayed photos, and automatically assigning an interest level grade to the one of the displayed photos using the physical response. The physical response can be a body movement or a facial expression. The interest level grade can be stored in a viewer profile for the viewer, and used for displaying photos for the viewer as a function of the interest level grade. The physical response, positive or negative, can be used to identify and suggest other related photos to the viewer, such as for a replacement photo related to the same subject matter.

In embodiments of this invention, the device and method include automated ranking of the photos to be circulated on the frame, such as for automatically determining an order of presentation, a number of display repetitions, and/or a time period of display for each of the photos as function of the ranking. The ranking can be based at least in part on a physical feedback response of the viewer to one or more of the photos, or based upon a picture quality and/or content. The photos can be clustered according to the rankings into groups for display or sharing.

The invention can include the incorporation or creation of user communities and sub-communities, with such communities and sub-communities sharing information. The digital picture frame of embodiments of this invention operates in concert with a method, system, and apparatus, such as embodied in an MPSM or other software application, that automatically determines and shares a location and/or an activity of a user. The application learns user activity over time, with the learning based upon user locations and/or context. The present invention generally provides methods and applications for an MPSM that automatically understands and informs the "who, what, when, where, and/or how" of a user and the user's community. For example, who are the user and their community with, what are the user and their community doing, where geographically are the user and their community, when are, and historically when were, the user and their community doing this, and/or how can users' behaviors be modified? The method includes automatic tagging of photos taken by the users with corresponding context data (e.g., location, activity, people present) learned by the system for use in determining photos to display on the digital picture frame of this invention as discussed above.

Other objects and advantages will be apparent to those skilled in the art from the following detailed description taken in conjunction with the appended claims and drawings.

DETAILED DESCRIPTION OF THE INVENTION

The present invention provides a digital picture frame that interacts with either a picture capture or storage device, referred to herein as an electronic device, running a digital picture frame application and/or social media to automatically display digital photographs from the electronic device and/or a social media account of one or more persons viewing the picture frame. As used herein, the terms "picture", "photograph", or "photo" refer to or include digital still photographs or digital video, including a combination of few-second animations either or both before and after a still frame, unless otherwise noted. The photos can be obtained by social media users and stored in the users' social media accounts. When a social media user views the digital picture frame, the digital picture frame automatically recognizes that user and automatically loads photos relevant to that viewer from her or his electronic device and/or social media account and/or from at least one electronic device and/or social media account of her or his social media community member(s). For example, relevant photos from a community member's social media account may include the viewer or be from a shared activity that the viewer attended with the community member. Automated social media activity learning methods, as described herein, are used to automatically determine relevancy of photos to one or more community members. Community members may choose to make photos shared or private to avoid personal photos being shared.

Figure 1:
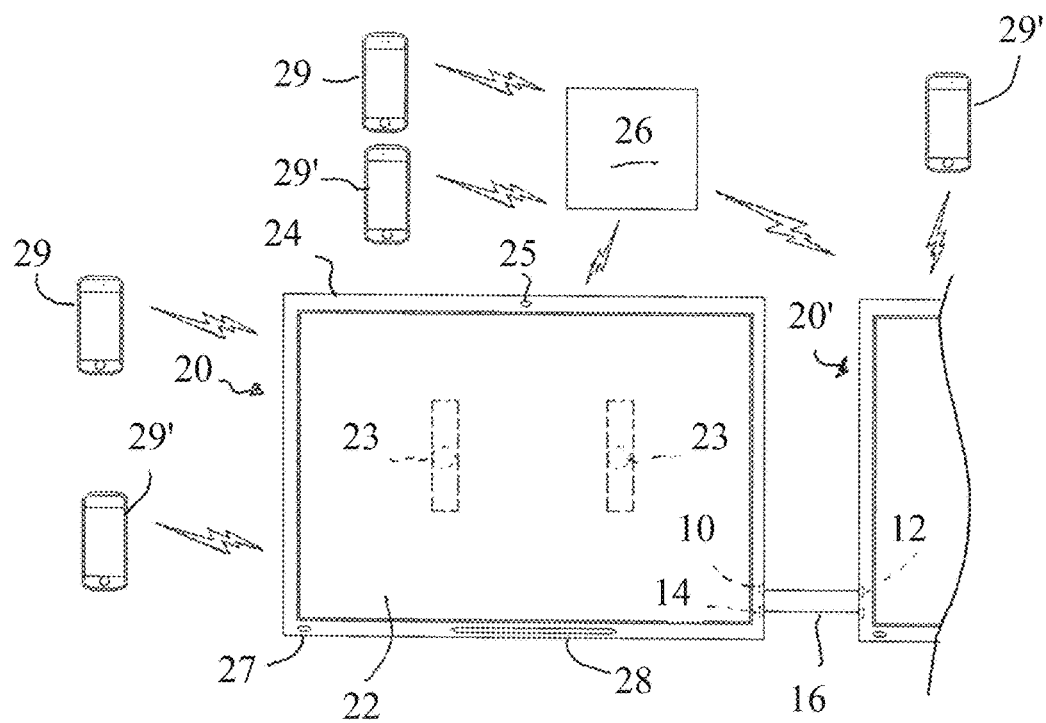
FIG. 1 illustrates a digital picture frame in network connection to a server and mobile devices, according to one embodiment of this invention.

FIG. 1 illustrates a digital picture frame 20 according to one embodiment of this invention. The digital picture frame 20 includes a digital display 22 mounted within an edge frame 24. The digital display 22 can incorporate any suitable screen, such as, without limitation, an LED screen or a touch screen, as are known and commercially available. A camera 25 is connected to and integrated in the edge frame 24. The picture frame 20 includes a network connection module that connects over a wired and/or wireless network to a social media server computer 26 and can automatically load photos stored within one or more social media accounts accessed through the server 26. The picture frame 20 further includes an automated display module in combination with the network connection module and adapted to automatically change photos displayed on the digital display 22 to photos from an electronic device and/or a social media account of the viewer and/or one or more community members, such as upon automatic detection with the camera of the viewer. The digital picture frame 20 desirably includes a microphone 27 in combination with the automated display module and/or network connection module, such as for receiving spoken instructions from a viewer to change the displayed photos.

The digital picture frame 20 further includes a leveling device 28 connected to or otherwise integrated with the frame 24. The leveling device 28 automatically detects when the frame is not level. Proper positioning of the digital picture frame is important to achieving user satisfaction. Auto detection of the positioning in comparison to the angle of the displayed photograph illustrated can be achieved using any of the image alignment or realignment techniques known in the art. In embodiments of this invention, the leveling device 28 can transmit or display corrective measures for physical correction.

In another embodiment of the invention, the digital picture frame 20 is configured with a leveling device that includes one or more motors 23, such as paired attached with a corresponding wall bracket via gearing. The motors 23 can be incorporated in a wall hanging mechanism as shown in FIG. 1, or otherwise implemented with respect to a frame stand. Upon detection of an unleveled viewing as determined by either the leveling device 28 or any other mechanism, the dual motors 23 activate and automatically mechanically operate as needed to level the digital picture frame 20, such as a vertical adjustment on wall mounting hardware, via the adjustable hanging mechanism or bracket.

The digital picture frame 20 includes an automated display adjustment device in detection combination with the camera 25. The automated display adjustment device automatically detects frame environment and/or viewer position using the camera 25 and automatically adjusts settings of the digital display 22. Augmented with the camera 25, the digital picture frame 20 supports a host of optional, additional capabilities. Using conventional, known in the art, image processing techniques, enhancement of the picture quality can be automatically made. For example, due to an automatically detected viewing angle or environmental brightness, picture lighting intensity and contrast can be altered. That is, depending on conditions, the brightness and contrast can be automatically modified to provide better viewing. Additionally, depending on the distance and angle of the viewer, the size of the image can be enlarged, possibly focusing on the center or content rich area of the picture. Similarly, a close viewer may wish to have the photograph or video in full scope, or may be, even side-by-side with one or more other, possibly related pictures or videos.

In one embodiment, as shown in FIG. 1, the digital picture frame 20 includes the capability to 'daisy chain' one or more additional frames 20'. That is, all participating frames can be connected so as to portray a single story, either chronologically or thematically, allow for two viewers, and/or provide a composite view of a single image. The frame 20 can include a network connection 10, such as an audio-video outlet and/or network outlet, to connect to a corresponding inlet 12 of the second frame 20'. The network connection between frames can be by wired connection (e.g., HDMI cord or Ethernet cable) or wireless communication (e.g., Bluetooth or WiFi) The frame 20 can optionally include a power output, such as outlet 14 to receive a power cord 16 of the second frame 20', so as to require only a single power source.

An embodiment of a digital picture frame 20 further includes multiple power options. In addition to conventional outlet and battery options, the frame can include at least one photoelectric cell. Inductive, or wireless, charging can also be incorporated.

The digital picture frame 20 includes a facial recognition module with any suitable facial recognition software, in combination with the camera 25 and automated display module. Face recognition software can be deployed to automatically detect the identity of the viewer(s). It is also within the scope of this invention to identify the viewer via the location or proximity of their personal electronic devices such as but not limited to their mobile phones or tablets. By identifying the viewer(s) the automated display module can then specially target, namely select, prioritize, and/or order the photos or videos displayed for the identified viewer.

Identifying the viewer enables a variety of novel applications. In embodiments of this invention, a viewer analysis module is combined with a facial recognition module to determine, for example, one of mood or health of the viewer upon detection of the viewer with the facial recognition module. The automated display module can augment a photo display on the digital display as a function of the determined mood or heath of the viewer, such as by showing photos to increase the viewer's mood.

Longitudinal analysis of the viewer is possible. Such analysis supports, for example, health commentary. By analyzing the viewer's face, comments such as, but not limited to, "you seem to have gained weight", "you look tired", or "you seem pale; do you feel well?" can be announced to the viewer. Similarly, "mirror, mirror on the wall" remarks such as "you look good today" can be stated, potentially elevating the viewer's mood. Displaying identified mood enhancing photographs, such as, for example, ones that include far away loved ones can likewise be shown to further elevate the viewer's mood. Identification of mood enhancing photographs can be automatically accomplished, for example, via the recognition of a "smiling face" or spoken words of the viewer when the picture was previously shown, and tagging of the photo.

Viewer identification also enables photo selection personalization. A viewer personalization module can be operatively combined with the facial recognition module, whereby the viewer personalization module automatically identifies preferred photos or restricted photos as a function of viewer information upon detection of the viewer with the facial recognition module. Photos favored by the viewer (e.g., grandchildren for the grandparent) can be selected, and conversely photos containing, for example, ex-spouses or in-laws can be repressed. Likewise, identifying viewer characteristics, such as age, enables the limiting of photos displayed. For example, children might not be shown photos containing potentially inappropriate content, such as containing nudity, or particular activities or individuals, such as relatives that have recently passed away. Thus, it is within the scope of this invention to limit or specifically select photographs to be displayed based on relationships of the viewer with individuals in the photographs, such as ex-spouses; characteristics of individuals shown in the photographs, such as babies; characteristics of the viewer, such as age; activities illustrated in the photographs, such as smoking; locations displayed in photographs both physically described (e.g., Chicago) or relatively described (e.g., viewer's place of residence); or based on any characteristics that can be determined via image analysis or photograph metadata included. The filtration or selection of photographs based on criteria is determined by settings that can be set.

Additional specialty settings are included. Such setting place the frame in nightlight mode where only a dim glow is illustrated; photo record mode to simply record all in the line of vision; video chat mode with other devices; and "stranger in the house" mode where only limited or stock photos are shown to prevent the potential identification of residents.

The digital picture frame 20 can likewise be used as a viewer assistant. Multiple ailments or conditions, such as but not limited to Alzheimer's, strokes, and dementia, affect memory. Thus, the digital picture frame 20 can be used to remind the viewer of the identity of family members and friends as well as of occasions, locations, activities, etc., of relevance as the photos displayed are labeled both by content and/or by metadata.

As previously discussed, the network connection module connects over a network connection to the social media server computer 26. It can likewise connect either directly or indirectly to the mobile device 29' of any community member or interested party having an appropriately configured device, such as digital picture frame application specific software. The connection need not be within a geographic proximity, and it is likewise within the scope of this invention that a geographically remote connection is supported via networks such as but not limited to as the Internet.

The social media server computer 26 can be any one or more computers that implement any suitable social media platform, such as the MPSM platform and automated learning steps described herein. The server computer 26 can obtain or have access to photos and learn user or activity information associated with each photo from, for example, mobile devices 29 of a plurality of MPSM users or community members, such as according to methods described herein. In embodiments of this invention, the automated display module augments a photo display on the digital display 22 as a function of photo metadata from the social media account stored on the server computer 26. The photos are automatically downloaded from the server 26 to the digital frame 20 upon, for example, automated detection of a corresponding viewer(s).

In embodiments of this invention, the photos can be changed according to the learned bias of a viewer, expressed and stored as part of a user profile at the server computer 26 and/or the digital picture frame 20. The picture frame 20, such as via the automated display module, includes or obtains the viewer profile of the viewer upon detection of the viewer via the camera. By establishing a viewing profile for each known or expected viewer, e.g., if a viewer is or has a community member, individual or group user viewing preferences can be maintained. A profile can be established using any one or more of the many known profile techniques known in the art, including but not limited to, asking the viewer, learning based on previous user selections, and/or correlations with previously automatically learned, via MPSM methods herein, locations, activities, and/or community member interactions.

In a preferred embodiment, viewer profiles are automatically learned according to methods described herein, and uploaded via an electronic device and/or the social media account of a detected viewer and/or her or his community members. The automated display module desirably displays a slideshow of photos for a detected viewer that is uploaded from: an electronic device of the viewer, and/or a social media account of the viewer or one or more social media community member of the viewer.

In the digital picture frame embodiments of this invention pictures or videos displayed can be augmented with the automatically learned and identified metadata corresponding to the pictures or videos. That is, the information learned, captured and/or displayed identifies the location, activity, and community member involvement on a per photo basis, indicating the with whom, where, when and what was being done when the picture or video was taken as well as any other associated metadata, such as the camera or video equipment used to capture the photo or video. Slideshow of photos for a viewer can be assembled and shown in a display order automatically determined as a function of photo profiling traits such as time (e.g., chronological order), photo location, photo content (e.g., people or activity shown in the photo), and/or community member presence at the time/location that a photo was taken.

The invention includes a method of displaying photos on a digital picture frame, such as shown in FIG. 1. The digital picture frame is hung or set on a surface by a user, for explanation purpose, named Susan. The picture frame automatically determines with the camera when Susan is viewing, or is the primary viewer of, the picture frame. The picture frame automatically determines Susan's profile from her detection. In embodiments of this invention, Susan's viewer profile is loaded from Susan's electronic device and/or social media account, and may be supplemented by additional information gathered via the picture frame itself, such as face recognition, account access information, and/or manual entry (e.g., picture frame display preferences). The viewer profile is desirably created and continually updated automatically according to the automated learning methods described herein. The viewer profile can include information such as, without limitation, family information, community member information, and/or user favorites (e.g., favorite locations, activities, colors, flowers, animals, etc.), learned through the social media account.

When the camera and coordinated software determines Susan is viewing the picture frame, e.g., either directly or merely in the vicinity, the picture frame automatically displays photos shown on the digital display as a function of the viewer profile information. The photos displayed are automatically augmented or picked as a function of comparing photo metadata and the viewer profile. In embodiments of this invention, the picture frame automatically displays for Susan a slideshow of photos (still and/or videos) relevant to Susan as a function of photo context. The photo context can be selected from the time the photo was taken (e.g., all photos from July 2015), photo location (e.g., all photos taken in Chicago), and/or photo content (e.g., all photos of vacations or involving her sister and/or her friend Mary). The photos can be imported primarily from her electronic device and/or social media, and optionally supplemented from photos on a recordable medium of the frame (e.g., hard drive or inserted flash drive or memory card) or photos obtained from a third party web site.

It is within the scope of this invention to prompt the user, possibly via any communication mechanism including but not limited to text and voice commands, to determine the exact wishes of the user. If the digital picture frame is additionally equipped with a microphone 27 and corresponding speech processing software, voice commands can likewise be processed using any of the many known speech processing systems. Susan can select a context, such as by spoken instructions, to be display. As an example, Susan may request all photos related to "college", related to "vacations", including "family", or including or relating to a particular person. The digital picture frame will download relevant photos for display from one or more electronic devices and/or social media accounts, of Susan's and/or a community member of Susan, that have context matching the request. If Susan asks for pictures of her and her sister, the pictures may include her sister or have been taken in the presence of both her and her sister, such as a picture of the Eiffel Tower taken during a trip with her sister to France. The Eiffel Tower photo is identified by context metadata that identifies that both Susan and her sister were present when the photo was taken. The context information is desirably automatically learned and stored with the picture in the social media account of Susan, using the learning methods described herein. Alternatively, the Eiffel Tower photo can be part of the sister's social media account, and because her sister is a community member and has given sharing rights, the social media server computer automatically shares the photo to Susan's digital picture frame. Desirably, any photo relevant to Susan can be automatically shared from any of Susan's community members and automatically shown on the picture frame display.

In one embodiment of this invention, the digital picture frame accesses social media or her electronic device without detailed instructions from Susan and loads and sequences photos displayed on the digital display as a function of profiling traits selected from chronological order, photo location, photo activity, and/or community member. Having automatically learned the location, activity, and community member involvement on a per photo or video basis using the method described herein, a "story telling" capability is supported. That is, in storytelling, chronological stories, optionally simultaneously displayed on a split screen, are grouped by: purely time, namely in sequential chronological ordering; location, namely a traversal of sites on a location based trip; activity, namely in chronological ordering of a given or similar set of activities; community member involvement, namely a pictorial interaction with community members, potentially segmented by particular community member or members; or any other profiling trait(s) of a recognized user that can be used to cluster or segment photos for automatic story telling.

In one embodiment of this invention, Susan's friend Mary joins Susan in viewing the picture frame, either directly or within a detectable vicinity of the picture frame. The picture frame automatically detects the additional presence of Mary, automatically detecting her identity, automatically obtains or loads Mary's profile, and automatically changes the photos displayed on the digital display to those relevant to both Susan and Mary. The photos could be obtained from Susan's social media account(s) or personal picture capture or storage electronic device but preferably, the photos are obtained from both Susan's and Mary's social media accounts and/or local personal picture capture or storage electronic devices, e.g., mobile phones 29 and 29'. Desirably the photos from each of the two viewers are shared activity photos; from activities shared by the two friends. The frame 20 and/or server computer 26 automatically determines shared activity photos of the two persons as a function of the learned context information automatically associated with the shared activity photos by the server computer. As more people are automatically detected, photos from more accounts or devices can be automatically added, and the photos automatically organized by context such as photo location, a photo activity, and the present community members. Options can be added on the social media accounts to share or not share photos with community members or their devices according to this invention.

In another embodiment, Mary and Susan each simultaneously, or within some specified duration of time, look at their respective digital picture frame 20 and 20', such as linked as shown in FIG. 1 or network connected when each frame in a different location (e.g., their respective residences). Remote frames can communicate, via a network, such as through server 26, and indicate to both Mary and Susan, each at their respective frames 20 and 20', their respective presence, potentially indicating when Mary and Susan are both viewing or viewed a photograph from a preselected set of photographs within the specified duration of time. The duration of time can be defined in terms of a specific time or as within a time interval commencing from when either Mary or Susan viewed the given photograph from within the preselected set. The frames 20 and 20' can automatically or upon instruction coordinate so that the two are viewing the same photos. Likewise the photos can be augmented to included shared experiences, and be uploaded from both of Mary and Susan's linked devices 29 and 29' and/or respective social media account.

In embodiments of this invention, photographs from digital photo collections are provided to the frame in multiple ways including but not limited to self-capture, transmission from remote photograph capturing devices, from other frames, and through server transmission. The frame either receives photographs taken by other devices or itself takes a photograph, if so configured. The digital photo collection(s) from which photos can be obtained and sent to the frame can be associated with one or more additional viewers and/or digital picture frames, and/or any electronic device of a community member of the viewer.

Independent of the means by which a photograph is obtained, at times, the main artifact within the photograph, such as, for example, the face of a person in the picture, is not properly aligned. As such, when displayed on the frame, either the main artifact is misaligned, or potentially, is removed all together. To mitigate potential misalignment, the frame and method of this invention can include or provide an automated smart cropping feature for automatically cropping and aligning the photos to fit the digital display of the frame.

For proper viewing, the frame or the server driving the disclosed frame can automatically crop and/or realign images. Without requiring user interaction, the server executes cropping software that realigns an image for proper display on the frame to ensure that the main artifact within the image is automatically scaled and realigned to a given aspect ratio (4:3 or 3:4 for example). The artifact may not be a single thing or entity, and, for example, could be a group such as two faces in the foreground close to each other or a tight group of people in a family shot. An exemplary non-limiting approach identifies the face areas and attempts to align a corresponding area at either center to top-33% of the image to be portrayed, depending on the size. Large faces can be centered vertically whereas smaller faces can be aligned in a top 33% of the display to show more of the person's body. Thus, when presented, the image is esoterically properly displayed.

Embodiments of this invention preferably also include image filtering, either at the frame or server level. Filtering can include removing images of faulty artifacts, such as, for example, low quality (blurry, etc.) images. Artifacts of unlikely interest can also be filtered. For example, photographs of pets containing faces are typically of interest, however animal photographs without heads are typically not of interest, and can be removed. The curator of the photographs, such as the owner or viewer of the frame, can additionally impose other image or content quality constraints. Content constraints can span people, places, artifacts, and actions; namely anything that can be recognized automatically by any image, photograph, or document processing techniques known in the art.

Embodiments of this invention enable the owner or user of a frame to specify additional constraints on the photographs displayed. Such as in the case of the photograph curator, the frame owner too may designate content restrictions; for example, pornographic photographs can be prohibited to display. Such constraining rules are defined and incorporated into the filtering approach. Note that it is also within the scope of this invention that the constraining rules include but are not limited to lighting characteristics, scene selections, number of individuals displayed, distance or horizon specifications, or any other photograph characterization features.

The invention further includes receiver (displayed) side based filtering where the filtering of content to display to be defined by not only by the curator/owner of the photographs but also the owner/user of the displaying frame. In the case of multiple owners/users of a displaying frame, the identity of the current viewer can be used to select the filtering limitations imposed. It is also within the scope of this invention that a default set of filtering limitations are imposed should the viewer not be identified, multiple viewers be detected, or any other pre-specified set of conditions. Constraints imposed on the quality of the photograph to be displayed can be implemented, but also constraints that filter based on the sender's (photograph capturer's) desires; namely the sender imposed restrictions on the photographs to be displayed on the receiving frame. The receiver, namely the frame's owner/user, also has the ability to limit the photographs to display based on their image quality or on their content.

The frame's owner/user provides the sender access to the frame. This access, without any receiver side filtering, aside from image quality constraints, gives the sender control over the content to be sent and correspondingly displayed on the receiving frame. By allowing the receiver to limit those photographs that are to be displayed, a greater sense of comfort and security are provided to the frame's owner; hence, the frame's owner is more likely to allow additional senders to access the frame, and thus, the community associated with the given frame is likely to grow. Receiver-side filtering rules can include, but are not limited to: general content restrictions, such as but not limited to restricting the display of nude photographs or photographs where too many people are included; individual specific restrictions, such as but not limited to restricting any photographs that include a previous spouse; or restrictions relying on metadata constraints, such as, but not limited to, restricting photographs taken prior to a certain date or taken at a certain location.

Figure 2:
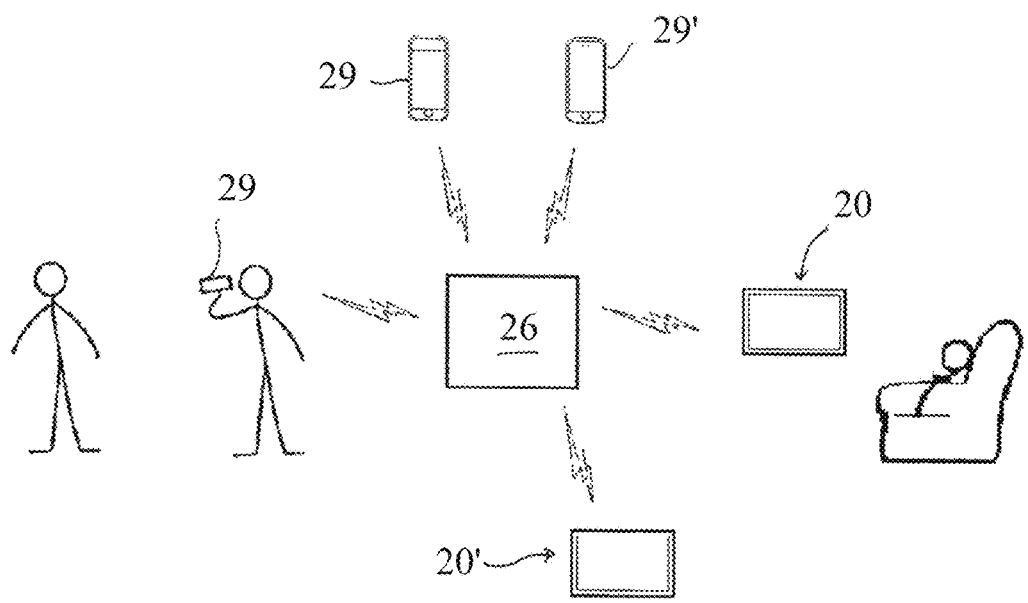
FIG. 2 illustrates a digital picture frame in network connection to a server and mobile devices, according to one embodiment of this invention.

FIG. 2 illustrates an embodiment of the invention including receiver-side photo filtering. In FIG. 2, Susan is at home with her digital picture frame 20. Susan's daughter Sally and Sally's husband Bob are in a remote location, where Bob takes a picture of Sally on Bob's mobile device 29. Bob is a community member with Susan (and both with Sally), and Susan has set content constraints to allow pictures of Sally taken by any community member to be displayed on her frame 20. In embodiments of this invention, when Bob takes the picture of Sally, the picture of Sally is automatically identified on device 29 and routed over a network, such as via social media server computer 26, to Susan's frame 20 for display.

To route the picture to Susan, the content of the digital photo is automatically identified, and any target electronic device, such as Susan's frame 20, that would receive the photo also needs to be identified and matched to the digital photo. The identified content is automatically compared to content constraints of Susan's frame 20 to determine if the digital photo should be routed to Susan's frame 20. Likewise other community member devices 29' can be similarly processed each time a photo is taken thereon to determine which, if any, photo matches or meets Susan's content constraints and should be routed and displayed on Susan's frame 20. Thus Susan can automatically receive, for example, photos of each family member automatically upon the photos being taken. Susan can control the content and quality of the photos, to exclude, as examples, photos taken by community members of or including non-community members, poorly 'angled' selfies, photos taken with or through particular apps (e.g., Snapchat®), fuzzy, grainy or poorly lit photos, or duplicate photos (e.g., photos taken within a predetermined timeframe of each other). Photos not meeting Susan's content constraints are desirably not routed to Susan's frame 20'.

In embodiments of this invention, content identification and/or a routing decision is/are determined by a content restriction filter. The content restriction filter can be implemented via software coding stored and executed on, referring to FIG. 2, the device 29, server 26, and/or frame 20. In embodiments of this invention, the filter components can be implemented in modules on more than one device. For example, a photo quality filter module can be implemented on the photo-taking device 29, to limit photos sent to the server 26. The server can then perform content identification on photos received, and route each photo to the target frame for which the photo meets the content constraints. Photo processing, such as cropping, aligning, scaling, enhancement, and repetition filtering can be performed on the frame, server, and/or mobile device, as needed.

The digital photo frame 20 can additionally detect via the camera Susan's physical response, for example a body movement or facial expression, to the routed/displayed photo, and an interest level grade based on the physical response can be associated with the photo. The interest level grade can be used to determine whether the digital photo is replayed, or a frequency at which it is replayed. The interest level grade can additionally be used to automatically update the content constraints, such as if Susan indicates a low interest to one or more photos of Sally with her tongue out, or with Sally at a particular location (e.g., a bar). In embodiments of this invention, the frame can display a message or message indicator requesting the physical response, for example so the frame can learn what photos to display.

FIG. 2 further illustrates a second digital photo frame 20' of Susan's friend Mary, remote from the frame 20. In an exemplary embodiment, Mary is a community member with Susan, Sally, and Bob, but Mary has not added/allowed photos of Sally or Bob in the content constraints of frame 20'. However, Mary loves Paris, and wishes to see all photos related to Paris from her community members. If Bob's picture of Mary with mobile device 29 occurs in front of the Eiffel Tower, then the content restriction filter module(s) will allow the photo to route to Susan's frame 20 because Sally is present, and will also route the digital photo to Mary's frame 20' for including content related to Paris. In this way, community members can learn of activities of other community members that are of particular interest, without receiving every photo from the other community members.

A non-limiting embodiment of this invention consists of at least one picture capture or storage electronic device 29 communicating directly via a network or wired or other wireless connection with the digital picture frame 20. To support such interaction, the picture capture or storage device 29 connects via the network to the digital picture frame 20 and downloads the digital picture frame interaction software to the device 29. Once installed, the application software scans all the available pictures on the device. The remaining process description is illustrated using a non-limiting example based on face selection. It is likewise, however, within the scope of this invention to select based on objects other than faces including but not limited to scenes, materials, and activities. A second device 29' (or more) can likewise link to the frame upon being in connection proximity.

Once selected, all photos containing faces are clustered by the application, either at the server or frame level. Individual photographs can then be automatically filtered based on features. Some of these features are quality related, e.g., red-eyes or blurred; some features are content related, e.g., excluding certain activities, people, or locations. Those photographs that remain selected can be tagged with additional metadata. Metadata includes all photograph generated information, such as but not limited to location, time, or weather, as well as derived data, such as but not limited to cluster identity.

The invention can use clustering to form grouped clusters according to photo content. The clustering is desirably performed as a function of a common detected content in the photos, such as things, places, activities, or combinations thereof. The clustering of photos can be used for determining a photo slideshow on the digital display of the photos from a digital photo collection as a function of the clustering. The grouped cluster can be integrated to a slideshow as preferred images, or used to provide requested slideshows, such as "show grandma".

Embodiments of this invention include identity clustering, such as by longitudinal facial clustering. Photographs are clustered not only in accordance to an individual identity at a given time, namely at a given age, but the disclosed longitudinal facial clustering clusters individuals throughout their lifetime. Consider a collection of pictures that span a prolonged period of time. In such a case, an individual naturally ages, and creating a collage of that particular individual necessitates accounting for their aging process. The disclosed approach uses photograph metadata, including but not limited to the date the photograph was taken, to age the individuals to a common age using any of the individual aging techniques known in the art. Once at a common age, clustering is performed to group pictures of the same individual.

Figure 3:
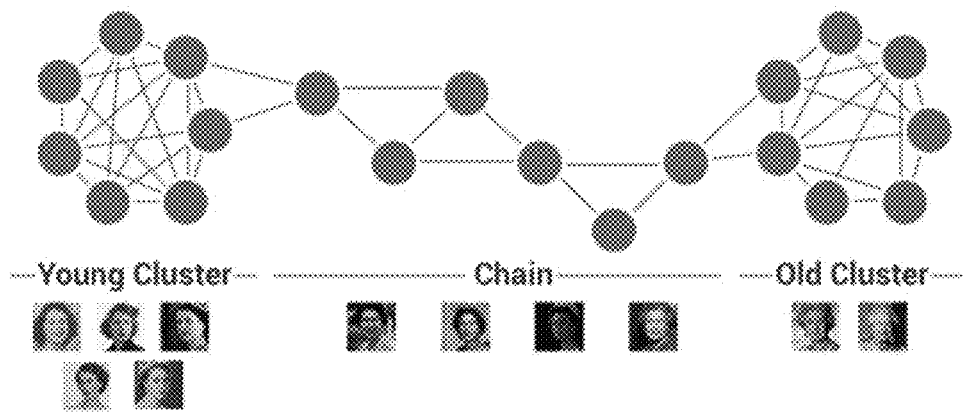
FIGS. 3 and 4 illustrate a photo clustering according to one embodiment of this invention.
Figure 4:
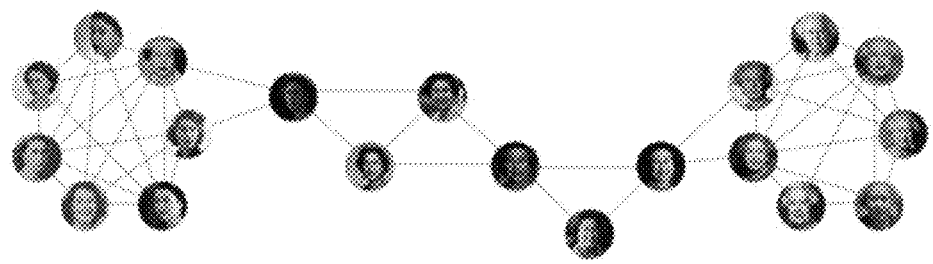

FIGS. 3 and 4 illustrate a clustering of photos of Queen Elizabeth. In one cluster ("Young Cluster") are photographs of the young Queen. Her age progression is represented in various sub-clusters forming a photo chain to a second cluster ("Old Cluster"). Note however that these photographs are all of Queen Elizabeth, and as such, they are all eventually clustered together (as represented by the linking edges) to form a larger cluster. The sub-clusters can be linked together by features that do not change as much over time, such as eye distance, head shape, nose shape, etc. Clusters according to this invention can be constantly updated and adjusted, such as using new photos and/or other new metadata.

An alternative or additional clustering technique uses statistical models of metadata. Using metadata, such as, but not limited to, location identification or date and time, the likelihood of a given person being at a given location at a given time is computed. Should photographs support such a given likelihood, they too are potentially clustered.

Similarly, metadata can be used to prevent the clustering of an unlikely set of photographs. For a non-limiting example, image-processing techniques are somewhat inaccurate at recognizing and disambiguating children. This can be particularly true for infants and young children. Photo metadata that indicate when and where a photograph was taken can be used to reduce or eliminate disambiguation. For example, photographs of children taken at a close time interval but at vastly separated geographical locations are likely to be different individuals. Similarly, children of a similar age but appearing in photographs taken far apart in time are again likely to be different individuals.

Clustering in additional embodiments of this invention employs a logical two-phase approach. It is within the scope of this invention that the "two phases" are integrated into a single phase, or are partitioned over a greater number of phases. Initially, a cluster is formed using facial recognition using any one or more of the many known in the art clustering techniques. This phase clusters photographs of individuals that closely resemble across all photographs. However, should an individual modify their appearance either intentionally, say but not limited to using a costume, or unintentionally, say but not limited to a lopsided profile, an erroneous separate cluster may result. Independent of cause, the merging of clusters of the same individual is needed. The second phase uses known image processing techniques to extract features of photographs within the given cluster. These features are used to represent the cluster, say via a representative centroid. By averaging the features across the photographs within the cluster, the effects of minor variances in some of the features are diminished. The centroids of all clusters are compared. If centroids of differing clusters are sufficiently close, the photographs within the close clusters are further examined. This further examination includes but is not limited to the use of respective metadata. If still deemed similar, the clusters are merged.

In another embodiment, the disclosed photograph clustering approach combines clustering with classification. Current clusters form the basis for inducing classification models. These models, in turn, are used to assign currently unassigned photographs to existing clusters if the similarity measure score employed meets or exceeds the discriminative threshold. It is within the scope of this invention to employ any of the many known in the art image similarity measures.

In another embodiment, the linking of similar photographs across frames or digital photo collections is performed. Frame and/or mobile device photograph collections are maintained separately, however the submission of pictures to a frame can constitute a community membership. Within such a community, photographs of individuals portrayed might be common. In some embodiments of this invention clusters of photographs across frames/collections are compared and the server suggests to the owners of the frames, as well as to those submitting pictures to the frames, to send photographs of common individuals to frames that already possess photographs of those individuals, but not necessarily the identified photographs. Thus, photograph sharing is fostered. It is also within the scope of this invention to impose a threshold on the minimum number of photographs that a particular individual must appear in a remote frame or other digital photo collection prior to suggesting that additional pictures of that individual be routed to that remote frame.

Another embodiment clusters photographs based on common detected objects. Exemplary objects include artifacts (things, places, activities) and living beings (typically people and pets). Locations and activities can be detected via metadata and individuals present can be detected via facial recognition.

Figure 5:
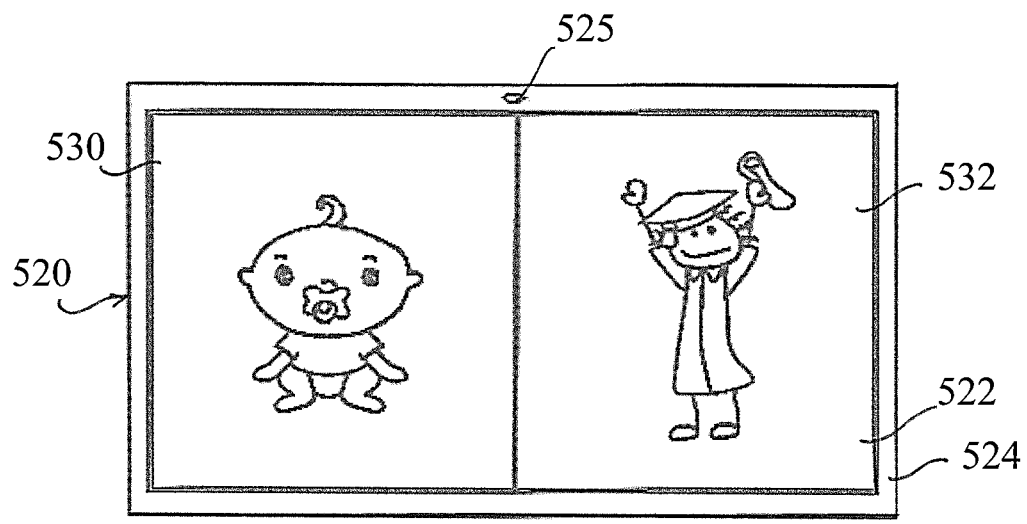
FIGS. 5 and 6 each illustrate a digital picture frame in network connection to a server and mobile devices, according to embodiments of this invention.

Embodiments of this invention incorporate split displays for displaying two different photos simultaneously side-by-side. The photo displays desirably alternate between single and dual (or more) photo displays. FIG. 5 illustrates a digital picture frame 520 in a split screen mode, according to one embodiment of this invention. The digital picture frame 520 includes a digital display 522, desirably sized with an aspect ratio (e.g., a 10.1 inch, 16:9 screen) beneficial to supporting both single photos and two side-by-side photos, mounted within an edge frame 524. A camera 525 is connected to and integrated in the edge frame 524. The picture frame 520 includes any feature(s) described herein, such as a network connection module that connects over a wired and/or wireless network to mobile devices and/or a social media server computer for automatically loading photos stored within one or more social media accounts. The picture frame 520 further includes an automated display module in combination with the network connection module and adapted to automatically change photos displayed on the digital display 522 to photos from an electronic device and/or a social media account of the owner, viewer, and/or one or more community members, such as upon automatic detection with the camera of the viewer.

The invention includes methods of photo-pairing for a two or more photo display. The photo pairing can be random or intuitive, such as pairing similar photos. Similar photos can be identified based upon photo content, including, but not limited to a person, more than one person, object(s), scenery/background/seasons, position of photographed object/person, and/or place. Photo metadata can also be used for matching. The pairing can be based upon one matching person, such as each photo including two different second persons (e.g., relatives) or in two different times/places, or two matching persons, such as in two different times/places. For example, the photo pairing can include one matching person, with each photo including the person and one of two other, related persons (e.g., mom and dad, different grandparents, different siblings, different pets, etc.) or places (two different graduations, different homes, different vacations, etc.). The invention also includes now and then side-by-side pairing, such as based upon age determination and clustering discussed above, where an older photo with one or more persons is paired with a newer photo of the one or more persons. A slideshow that changes one or both sides of the dual display is also available by this invention, such as showing a baby photo with an adjacent slideshow of the person at other ages (monthly, annually, etc.).

Methods of this invention include identifying two different photos in one or more digital photo collections that include a matching photo content, and displaying the two different photos simultaneously in a split screen mode on the digital display. FIG. 5 shows a display 522 with a screen digitally divided into two equal sections. A first photo of the two different photos is in a first section 530, and a different second photo is in a second section 532. As illustrated, the matching photo content between the two different photos is a same person. The same person is shown as an infant in the first section 530, and at graduation in the second section 532. The two different photos are thus photographically captured in two different calendar years, wherein the two different calendar years are separated by more than one additional calendar year, and paired or linked using methods described herein.

The matching of these photos can be done by the age-based clustering described above. Embodiments of the invention include automatically clustering digital photos of the digital photo collection according to a content, and automatically selecting the two different photos as a function of the clustering. The two different photos can be selected from the same or two different photo clusters, such as on one or more electronic devices (e.g., both mom's and dad's separate clustered photo collections).

Embodiments of this invention include automatically clustering photos of the digital photo collection over a timeframe for display by preparing a plurality of sub-clusters, each for a common detected content in the photos selected from things, places, activities, or combinations thereof. Each of the plurality of sub-clusters is formed of the common detected content at a similar time and/or age. Related sub-clusters of the common detected content, such as over a longer time period, are linked together to form a cluster of related common detected content for display, such as a function of one or more predetermined features having limited change over a timeframe. A first of the two different photos for the dual display can be selected from a first of the related sub-clusters and a second of the two different photos from the second of the related sub-clusters.

Figure 6:
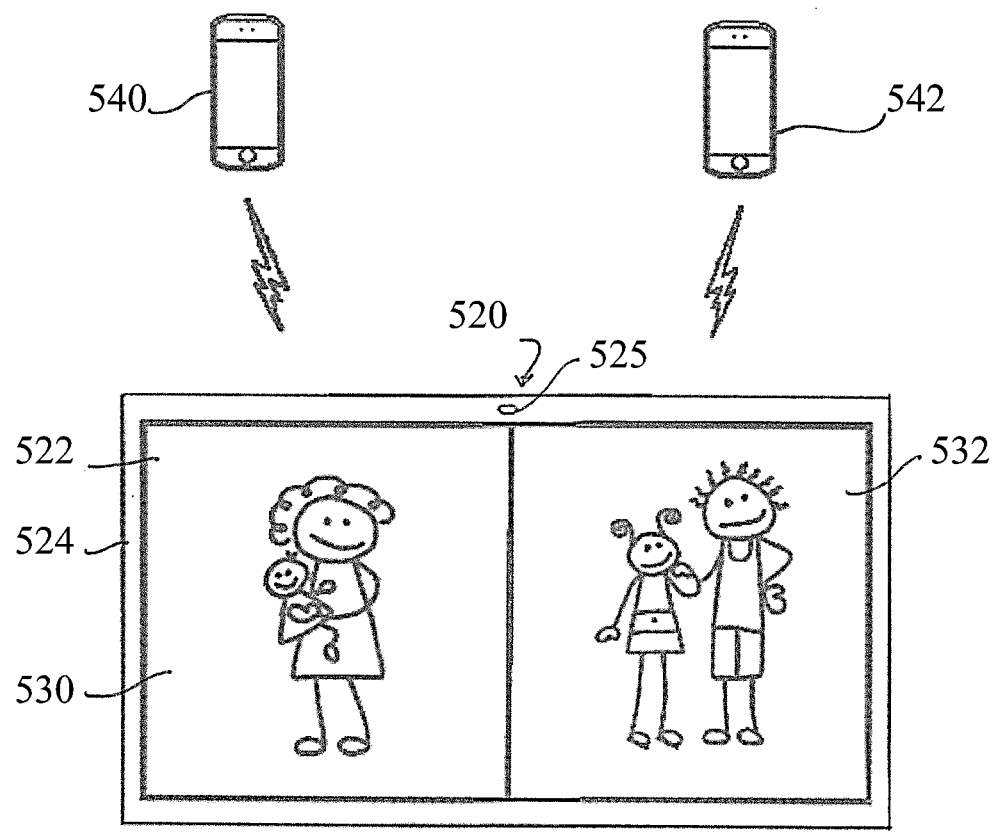

FIG. 6 shows the frame 520 with additional photos displayed. In FIG. 6, the matching photo content is a same person and each of the two different photos further includes one of two different second persons. The same person is a young girl, shown as an infant with her grandmother in section 530, and at a second age (e.g., a teen) with her grandfather in section 532. The photo pairing thus uses age-based cluster matching, and determines two different second persons that are related family members. The two photos can originate from a same or linked cluster(s), from a same device or interaction application, or from two different clusters, such in two different devices or interaction applications. As shown in FIG. 6, the photo of section 530 is obtained from the grandmother's device 540, and the photo of section 532 is obtained from the grandfather's device 542. As an alternative example, both photos could be obtained from a photo collection of the mother of the girl.

Photo data can be preprocessed on the photograph-capturing device. The clustering and cropping approaches described herein assume the availability of the data on a server. However, given current computing capabilities on the photograph capturing devices, such as but not limited to GPUs, significant preprocessing can immediately occur on the actual device In doing so, the bandwidth required to transfer the photographs to the server is vastly reduced. In embodiments of this invention, preprocessing includes, but is not limited to: image quality detection and enhancement (if photographs remain of poor quality then exclude); content filtering (for example, pornographic or chopped feature images are excluded); and repetitive (same picture taken multiple times, only highest of quality is sent).

Additionally, picture fingerprints (compressed or very low resolution versions) can be generated on the capturing device, and only the fingerprints are initially sent to the server. If the server deems these pictures as desired, based on any pre-established criteria, the server informs the device, and the original pictures are transferred Using such an approach, only desired pictures are sent to the server, again reducing the bandwidth involved in the transfer.

Cross capturing-device filtering can also be incorporated. Using picture fingerprints, devices can interact directly among themselves to determine which photographs to transfer to the server. For example, a set of community members may wish to strictly share images of common interest, and in embodiments of this invention the devices can share fingerprints and automatically filter photographs of similar nature. Thus, only one of the photographs, potentially evaluated to be of the highest of quality among the similar pictures, is transferred to the server, again reducing the transfer bandwidth. Additionally, a voting procedure can be imposed where only those picture with a sufficiently high vote are transferred.

Likewise within the scope of this invention are other criteria by which to select the photograph to transfer. Non-limiting additional or alternative criteria include but are not limited to the power availability or bandwidth capacity of the capturing device. As an example, if a device has low bandwidth capacity or is nearly out of power, another device might be selected to send its version of a similar photograph.

Photographs are posted to frames for the pleasure of the receiver, namely a viewer of the frame. In embodiments of this invention, the frame provides the frame viewer with the capability to provide feedback to the sender of the photograph. Via a physical response, such as a hand gesture, the viewer can send, if they so wish, an indication of the degree of excitement or dissatisfaction with a given photograph. Once the gesture is captured and interpreted, the frame sends the server a message indicating the viewer's interest level in the photograph, which in turn, is stored and applied at the server level and/or indicated to the sender of the photograph. Such a feedback loop motivates the sending device or collection to automatically send or not to send similar additional photographs. Likewise using facial recognition, the frame can identify the viewer, and if desired, tag the feedback with the viewer's identity. Also the frame can infer feedback expressed via facial expressions using facial recognition. Similarly, other body movement gestures, such as but not limited to the nodding or shaking of head representing positive or negative feedback, respectively, can be captured and treated as feedback.

The invention further includes ranking the photos to be circulated on the frame, such as for the purpose of automatically determining an order of presentation, a number of display repetitions, and/or a time period of display for each of the photos as a function of the ranking. For any given frame, the photographs sent to the frame are circulated. The ordering of presentation of photographs for a given frame can be based on a ranking. In one ranking, similar photographs are clustered based on, for example, but not limited to people, places, things, or activities. Photographs within these clusters are then shown in succession or within a predefined, or viewer set, separation of each other. In another ranking application, feedback provided by the frame viewer(s) is used to determine the ordering, with bias given towards the more favorable photographs. In yet another ranking application, photographs are presented in a random order. In yet another ranking application, popular photographs, based on feedback, are repeated, possibly even frequently. In yet another ranking application, all photographs are shown prior to any repetition. In yet another ranking application, the time stamp of the photograph is alternatively or additionally used for ranking. That is, a chronologically ascending or descending order of photographs can be presented. In yet another ranking application, photographs are displayed according to similar seasons or dates within successive or separated years. In yet another ranking application, a popular photograph is displayed longer prior to being replaced by its successor. In yet another ranking application, the duration of display is the same for all photographs. In yet another ranking application, photographs are clustered according to time slices, the number of photographs within each time slice is computed, and photographs within popular time slices are shown more frequently. It is within the scope of this invention to vary the time slices significantly, whereby brief time slices with high photograph counts tend to indicate great interest in the shown event, location, or individuals Lengthy time slices, without loss of generality, can account for trips, seasons, or any sustained activity or event. In yet another ranking application, the viewer explicitly specifies the ordering and duration of display. One skilled in the art recognizes that any ranking rule known in the art can be imposed and that these presented rankings serve only as non-limiting examples. More so, multiple combinations of these and other ranking schemes are likewise supported by this invention.

Another embodiment of this invention includes, and the digital picture frame is implemented with, a method, system, and/or apparatus, such as embodied in an MPSM or other software application, that automatically determines and shares a location, an activity, and/or photos of a user. The application learns user activity over time, with the learning based upon user locations and/or context. The application can learn through automatically determining activities at locations based upon known context information and past context information for the location. The application can tag photos for determining context relevancy for showing on the digital picture frame, as discussed above. The invention further includes energy saving location methods for the mobile device that can be used to more efficiently allow the location and social media aspects of the invention to be implemented on a mobile device. The method and application can be used for any suitable function, such as a safety and/or reminder serves, and is particularly useful for use in social media applications and for generating photos for display on the digital picture frame. The invention will be described below with implementation in an MPSM system, and particularly with an MPSM application that learns user activity over time, with the learning based upon user locations and/or context.

The MPSM method and system of this invention is mobile and positional in nature. Such systems, like many other systems originally developed on one type of computing platform but migrated to another, operate not only on mobile environments. That is, while MPSM implementations are targeted to primarily execute on mobile devices, such as but not limited to smart-phones, tablets, and/or laptops, they often support implementation for non-mobile environments such as but not limited to desktops and workstations, servers, and large scale compute farms and cloud computing servers. The invention will be described below with a mobile device, such as smart phone having cell service, a GPS system, and access to the Internet via WiFi. The MPSM method and system of this invention is desirably executed or implemented on and/or through a mobile device computing platform. Such computing platforms generally include a processor, a recordable medium, an input/output (I/O) device, and a network interface capable of connecting either directly or indirectly to the Internet. The mobile device executes over a networked environment, a non-limiting example shown in FIG. 7. The mobile device is connected, either directly or indirectly, using any of the many techniques and technologies known in the art, over a network, to back-end system or systems, itself/themselves computing devices. The mobile device can connect with a remote server, shown in FIG. 7 as server 38, to store and/or access user or community information.

MPSM systems are used to support users remaining socially aware of their community. That is, their primary usage typically is to actively monitor the location and activity of family members, friends, colleagues, and generally others within one's community. Communities can be partitioned into sub-communities where the union of the sub-communities forms the user's community. The sub-communities may or may not overlap. The partitioning of communities into sub-communities is beneficial in supporting specialized applications. For example, while a user might have general interest in the location and activity of all of their community members, they might be particularly interested in the location and activity of those who might be suddenly in need of assistance.

The creation of a community can include the issuing of invitations. An invitation is a request by a user A of another user B to allow the inviting user, user A, to track the activities of the invited user, user B, and vice versa. If the invited user accepts, the inviting and invited users form a community.

A community is relevant to only that user which formed it. That is, different users have different communities. A community is a grouping of invited (referred to as remote) users by the inviting (referred to as local) user. A local user can partition or merge a community, thus forming a sub-community or a parent community, respectively. For example, consider 5 users: Bob, Sam, Sally, Alice, and Susan. Bob can invite Sam, Sally, and Alice, thus forming his user community. Bob can likewise partition his community into a sub-community consisting of only Sam and Sally. Sally can invite Susan. Thus, Sally's community would include Bob (via his invitation) as well as Susan. If no additional invites occurred, Sam's and Alice's respective communities would only include Bob (each via Bob's invitation), while Susan's community would only include Sally (via Sally's invitation).

Providing users with the opportunity to expand their communities in a convenient manner is advantageous. Such expansion can seamlessly be accommodated by including users listed in a user's contact lists either as a whole or selectively into their community. Contact lists include, but are not limited to, users listed in a user's local address book, e-mail contact list, Twitter follow list, LinkedIn connections list, and/or Facebook friends list. By incorporating users listed in a user's contact list, the user's community is expanded without effort. Note, however, that selected inclusion can be supported; thus enabling community growth without unnecessarily over-expanding the community. That is, entries from the contact list can be included in their entirety and the user can selectively remove those entries which s/he wishes to be excluded from the community. Similarly, entries from the contact list can be selectively added.

Users are identified by their account identifier. To use MPSM a user account is created. User accounts generally require a user login, which is a unique user identifier, and a password or equivalent. After having created an account, a user can log in. Initially, the local user does not have a community. In embodiments of this invention, over time, the method and application tracks the activities and location of the local user. Should the local user establish a community as aforementioned described, the community members will likewise be tracked. Local users receive notifications of the location and activities of their community members. Once logged in, the local user can select to activate or deactivate self and community tracking and notification. If not overwritten, default settings are used.

Whenever logged in and tracking is enabled, a user's location and activity is tracked. That is, a user periodically records their location and/or activity. Locations are tagged by name. Names can be but are not limited to the following schemes: physical (e.g., 123 Oak St.), absolute (e.g., Acme Coffee), and/or relative (e.g., my work office), or proximity (e.g., two miles from home). Activities are typically events. These events might be common to the entire community such as: "drinking coffee," "eating lunch," "sampling wine," "working from home," "commuting," etc., to more specific to a local user such as "restoring car" or "driving to lake home." Multiple activities can occur simultaneously. Users can change their activities at any time.

Unless preloaded or derived from an external source, such as but not limited to a location database, initially, all locations and activities are unknown. Local users must record all such location-activity combinations, i.e., a local user must name or tag the location and the associated activity. A list of activities common to the local user's community can be provided. This community activity list can be ranked either arbitrarily (randomly), according to most recently used, most frequently used, relevance to location, alphabetically, etc. Eventually, an activity list specific to the local user is learned. This local user activity list can be displayed to the local user either individually, along with the community list, or merged with the community list. Again, any of these lists can be ranked as previously mentioned.

Figure 7:
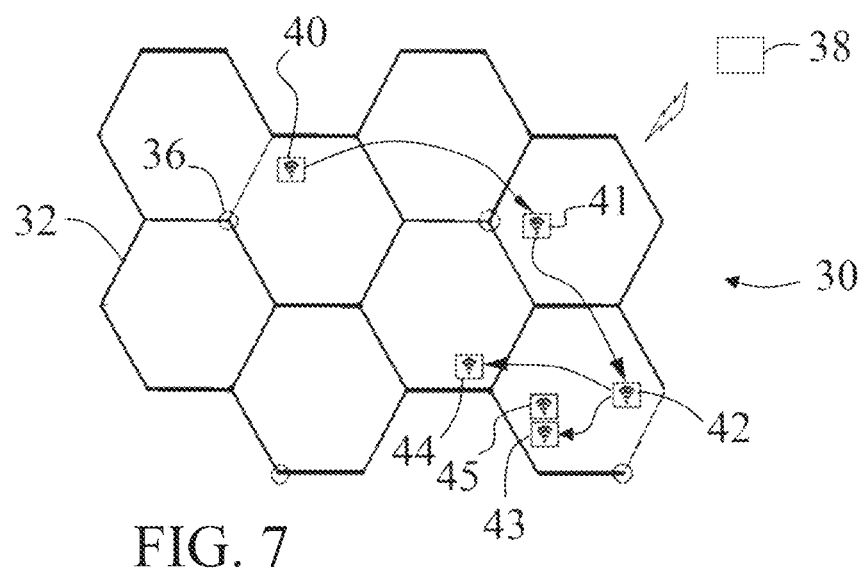
FIG. 7 shows a representative area of a user according to an MPSM method of one embodiment of this invention.

FIG. 7 illustrates a representative area 30 to demonstrate a method of and application for locations and/or activities of a user participating in a social networking service. The area 30 is shown as a cellular communication network including a plurality of cells 32 each disposed around a cellular communication antennae or base station 36. Within the area are a plurality of destinations each shown as including a WiFi Internet connection. The local user has one or more electronic devices, such as a mobile device that communicates with a remote server 38 via the cellular network and/or the WiFi connections. As will be appreciated the methods and applications of this invention can operate within any suitable size and configuration of the communication area, depending on what the user encounters.

Destination 40 is the home of the user. The user commutes to office 42 for work on most business days. On the way the user typically stops at the coffee shop 41. For lunch on most days, the user visits restaurant 43, but on Wednesdays the user typically meets a second user for lunch at restaurant 44.

At each destination 40-44, the user enters user information about the destination. The application and computer system that receives the user information automatically associates the user information with the destination, and stores the user information in a locations database, such as on the device and/or at server 38. The destination desirably is determined automatically and tagged with the user information, such as a location name of the destination and/or the user activity being performed at the destination. For example, destination 40 can be tagged as "home" and likely has numerous activities associated with it. The destination 41, and any photos taken, can be tagged as its establishment name "Acme Coffee" or simply "coffee shop" and associated with the user activity of "buying coffee" or "latte time." The manually entered user information can then be automatically shared to the user's community in a social networking service. Similar user information is received for the other destinations 42-44. The user information desirably includes any other information about the location or activity, whether manually entered or automatically determined, such as the time of the visit or activity. Some destinations, such as home or work will likely have multiple user activities over a period of time, such as "coffee break," "meeting time," and/or "quitting time."

The computer system receives user information and associates the user information with the corresponding destination, and any photos taken, for multiple visits to each of the destinations 40-44. The computer system begins learning the locations and user activities. In embodiments of this invention, the user can be automatically prompted for confirmation of the user information upon arriving at a destination to confirm the location and/or user activity. For example, the user can be provided with an automatically generated list of previously entered user activities for the destination upon arrival, thereby promoting efficient collection of information. The items on the list can be listed in an order based upon a particular ranking, such as number of times entered previously or based upon a context, such as what activity is likely being performed at a particular time of a particular day.

Over time, the computer system learns the user information and begins automatically associating and identifying at least some user activities for corresponding locations and any photos taken. As will be appreciated, the automatic identifying of activities at locations will likely occur at different rates for different activities and locations, with some locations having fewer activities and/or more frequent visits than others. In preferred embodiments of this invention, the system automatically shares the user information in a social networking service upon automatically detecting further user arrivals at the destination. Photos taken are likewise automatically tagged with the user information. The automatic sharing of user locations and/or activities desirably occurs upon the user's arrival at the location, or at a particular time at the location. As such the invention includes an automatic detection of the user's arrival at a destination. The automatic sharing and photo tagging desirably operates without user action and prior to receiving any additional user information for the destination.

As an example, the user may typically purchase lunch at destination 43, but on Wednesdays typically goes to lunch with a friend or spouse at destination 44. The lunch routines of the user, and particularly the Wednesday lunch routine, can be learned by the system and automatically shared to the user's community upon the system automatically determining arrival, without manually input from the user. If the user is having lunch with a community member, then the system can automatically determine that both users are at the same location together to automatically recognize and confirm the lunch activity, and proceed to automatically share the information for both user's to their respective communities. If the user deviates from a routine, the system can know this, and refrain from sharing the typical destination, by the mobile device detecting a different location than the typical routine destination.

In embodiments of this invention, learning is accomplished by any known machine learning, data mining, and/or statistical techniques known in the art. Supervised, semi-supervised, and/or unsupervised approaches can be used, including, but not limited to Naïve Bayes, Neural Networks, Support Vector Machine, and/or Associating Mining based techniques.

The MPSM method and system of this invention desirably records all posted locations and activities. Throughout use, the disclosed invention learns the corresponding locations and the set of associated activities. More so, via comments made by the local user and by the local user's communities, the importance of the activities can be learned, such as for the prompting discussed above. Importance can be either local user or community biased. Additionally, importance can be biased by context. For example, community members as a whole might prefer "eating steak," "eating pizza," and "eating sushi," in that respective order. On the other hand, a local user might only eat sushi. Thus, local user bias will yield "eating sushi" only, while community bias will suggest "eating steak," "eating pizza," and "eating sushi," in that respective order.

In embodiments of the MPSM method and system of this invention, locations are named according to a naming convention. Regardless of the naming convention used, a location is a physical geographical position. More so, physical geographic locations associate properties that can vary with or be dependent on context, namely time and date (hours, day of week, calendar date, etc.), users involved, and their relationships to each other, etc. This context can affect the associated location name or activity.

A common scheme that can be used to at least assist in identifying a physical geographical location is via the use of geocoding. Geocoding is the representation of a physical location via the pairing of latitudinal and longitudinal coordinates commonly referred to as a lat-long pair. Global Positioning Systems (GPS) can also determine a physical position coordinated via the triangulation of satellite transmissions. Typically GPS devices derive lat-long pairs which are made available to a variety of applications, often via map displays. GPS economics, accuracy, and simplicity of use resulted in their wide appeal and commercial success. Their continuous use in mobile devices is problematic, however, as they are energy intensive and rapidly drain the battery. Thus, alternative means or approaches to detect locations are desired.

Embodiments of the MPSM method and system of this invention, as discussed above in FIG. 7, use or rely upon cell coordinates. When mobile devices communicate with a cell tower, they send their cell coordinates. These coordinates are recorded by the cell provider and are typically not publicly known. The cell phone or, in this case, the mobile device supporting the positional social media system, however, is aware of their coordinates. Thus, the device can store the cell coordinate position and automatically associate that cell coordinate with the location name provided by the local user. Over time, a location database of cell coordinate and named location pairs is created. The local portion of the database favors the local user. The union of all the local portions of the location database desirably constitutes the name space of the entire MPSM system of this invention. It is understood that any of the many database management systems or storage schemes known in the art can serve as the platform for this location database. Thus, location names can be provided without the need to rely on a global positioning system, reducing battery consumption. Location data can additionally or alternatively be purchased or otherwise provided by a third party.

An additional and/or alternative approach for automatic location determination relies on WiFi triangulations. Mobile devices can grow and maintain a database of known open WiFi networks, for clarity we call this database an Open-WiFi-Net database. Such mobile devices can use the information stored or derived from the information stored in the Open-WiFi-Net database to further refine the accuracy of a location without the use of GPS. Via point triangulation, when an Open-WiFi-Net database is available, the mobile operating system uses not only the cell tower but also WiFi triangulations to determine location. It is within the scope of this invention to use either or both cell-phone and WiFi triangulations to enhance location information in addition to any other disclosed approach. The mobile device can use the WiFi signal at a destination, such as destination 43, and additionally or alternatively any detectable open WiFi signal from a neighboring location, such as establishment 45 that is adjacent destination 43.

Having created the location database, searching, namely querying, the database uses the cell coordinate or the location name. That is, a location name query takes a location name as input and returns the corresponding cell coordinate. A cell coordinate query takes a location name as input and returns the corresponding location name. Note that, multiple names can be attributed to a given cell coordinate. That is, a local user might name a location using multiple different names; different users can name same locations using different names. Similarly, the same name can be used for different cell coordinate locations. All names corresponding to a given cell coordinate are returned. It is within the scope of this invention to selectively return names based on context, user, or community bias. Similarly, all cell coordinates corresponding to a given name are returned. Again, it is within the scope of this invention to selectively return coordinates based on context, user, or community bias. Ranking of the results returned can, when desired, be biased towards the local user.

A key concern for MPSM systems is collecting location information. Clearly any location information available within the mobile device should be harnessed. Thus, if GPS readings or any other location information is generated by other device resident applications, these readings are desirably recorded and utilized by the method and application of this invention. However, reliance on strictly other applications to obtain positional information is obviously not realistic or possible.

In embodiments of the MPSM method and system of this invention, positional information is obtained via the use of geofences. A geofence is geographical boundary or "fence" surrounding a positional reading. As these boundaries are radius based, geofences are generally circular. Location transmission occurs whenever a handover of one cell tower to another occurs and is expected but not guaranteed to occur once a geofence boundary is crossed. To track location, periodic location transmissions are required. Since location transmissions must be minimized to conserve device energy, transmissions should only occur given geographical movement. Thus, crossing a geofence should generate such a transmission. Unfortunately, as crossing a geofence does not guarantee a location transmission, increasing the likelihood of a transmission is necessary.

In contrast to the known uses that surround a location with a single geofence, to increase the likelihood of a location transmission during movement, embodiments of this invention include surrounding a location geofence with a plurality of geofences. In one embodiment of this invention, a method and system of tracking a user includes determining a location of the mobile user, automatically establishing a first geofence around the location, and automatically establishing a plurality of additional geofences around the first geofence, with each geofence including a boundary. A location transmission is obtained by the mobile device upon crossing a boundary of the first geofence or any of the plurality of additional geofences. Multiple neighboring geofences are advantageous since they increase the likelihood of a location transmission as their boundaries are likewise likely to be crossed given movement.

Figure 8:
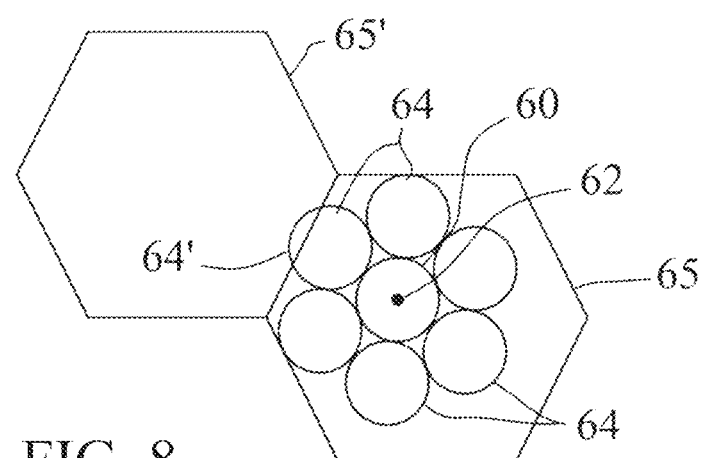
FIG. 8 illustrates geofences surrounding a current reading and its immediate neighbors according to one embodiment of this invention.

FIG. 8 representatively illustrates a geofence 60 surrounding a current location 62. The geofence 60 is surrounded by additional geofences 64, all within a given cellular tower transmissions cell 65. Note that part of a neighboring geofence 64' is not fully within the cell 65, and hence, limits its benefits since a cell tower handoff by movement into cell 65' will generate a location transmission.

Geofences are implemented as software processes. Operating systems for mobile devices, such as but not limited to iOS and Android, limit the number of processes available to an application, and thus, the number of geofences is bounded. However, this limit typically exceeds the number of geofences generated using the approach described above. Therefore, additional processes are available, and hence, additional geofences are possible.

To increase the likelihood of a location transmission given movement, in embodiments of the invention, the remaining available processes implement static geofences. A static geofence is not dynamically generated given a new location as previously described. Rather, a static geofence is one that is fixed and represents those locations that are likely to be crossed by a given user. That is, users are habitual and frequent a limited set of locations often, for example but not limited to, their home, office, or favorite wine or sushi bar. By learning the frequent locations of users both individually and system wide and setting static geofences at these locations, biasing by the individual user, the probability of a location transmission is increased since additional geofences are likely crossed.

More so, these repeated locations vary by city, county, state, country, etc., as well as by other factors such as but not limited to day and time. Geographical and temporal presence can thus be used to vary the set of static geofences for a given user. For example, the set of static geofences for a given user will vary if the user is in Washington, DC rather than in San Francisco, CA. Similarly, the set of static geofences for a given user will vary depending on the day and time. For example, a user frequents work on weekday mornings but frequents their favorite bagel shop on Sunday mornings and their favorite sushi bar on Thursday evenings.

Location transmissions suffer from a margin of error. Thus, it is difficult to precisely pinpoint and tag a location with a single transmission. Embodiments of this invention include automatic refining of a location of a user destination as a function of user routines, such as established by several user visits to the destination. As time progresses however, and a user frequents the same location multiple times, multiple location transmissions for the same location are recorded. In one embodiment of this invention, as representatively shown in FIG. 9, by overlapping the transmitted location along with its margin of error, a more accurate location can be derived. The overlapping of location transmissions for a given location 70 between streets 72 and within geofence 74, along with their margin of errors, represented as circles 76, yields an accurate location placement.

Figure 9:
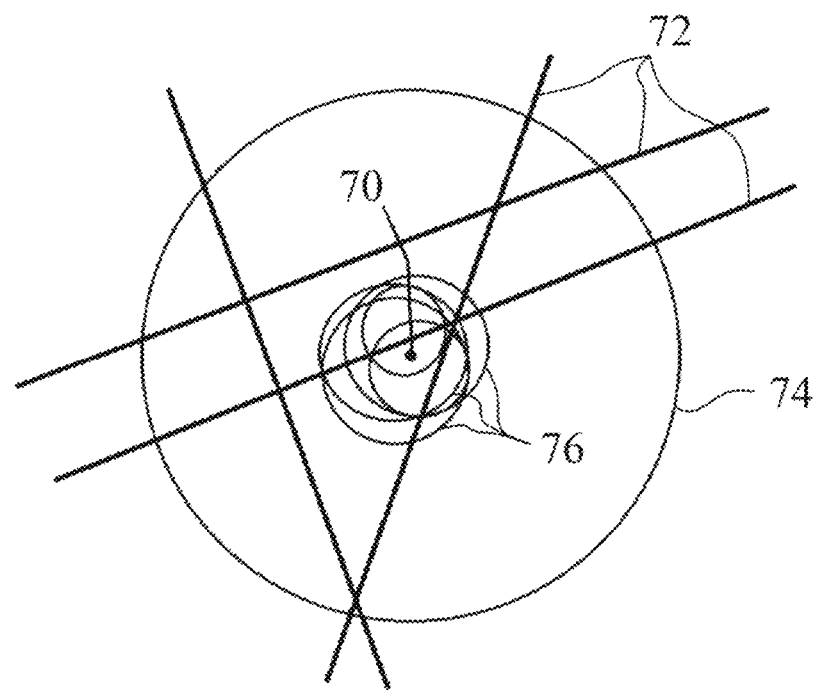
FIG. 9 illustrates the determination of a location via intersecting circles according to one embodiment of this invention.

As shown in FIG. 9, location accuracy improves as related data are collected. Related data, however, can, at times, be somewhat erroneous (in terms of accuracy). A non-limiting example is an entrance to a shopping mall. Such an entrance is not necessarily at the center of the complex. Regardless of the entrance displacement from the center of the complex, the entrance location can still be used to increase location accuracy of the mall complex since the readings for the entrance are consistent. That is, for a given user, given mobile device, given carrier, etc., such location recordings remain consistent, all be it, slightly erroneous. Thus, even dirty, namely potentially inaccurate, data can result in correct location identification.

Additionally, having established a location, corresponding lat-long pair coordinates can be reversed engineered, namely mapped back onto, a place name. These derived lat-long pair coordinates become yet an additional information component that is used by a learning system to better refine a mapping to a named place. Machine learning, data mining, and statistical approaches that are supervised, semi-supervised, or unsupervised can be used, as known in the art, to cross-correlate all available location related data.

Once determined, the user information including the location and/or the user activities are automatically stored in a database. Embodiments of the MPSM method and system of this invention include a computer server for providing and implementing the tracking and/or social networking service of this invention. The computer server includes a location module to determine the user location and/or a tagging module configured to correlate manually entered user information to a user destination and a database module configured to store user information including user locations and user activities at the user locations. For social media and photo sharing, the server further desirably includes a communication module configured to automatically share a user activity or photo in the social networking service upon further user arrivals at a corresponding one of the user or community locations. The server can also include an association module configured to associate the user activity with the corresponding user location and any photo taken.

Since location transmissions are needed during movement, the obvious question arises: when should the transmissions cease? That is, the system must determine when the user has arrived at a location to know when to perform the automatic steps discussed above. As discussed above, GPS systems are an energy drain on a mobile device, particularly as the GPS remains on and linked with the satellites to maintain location detection. Keeping a GPS application operating is a drain on both the processor and the battery of the mobile device. This invention provides a method and executable application that conserves energy by not continually running during use of the mobile device.

Embodiments of the MPSM method of this invention provide an automated method of tracking a mobile user that includes providing a location module configured to receive location transmissions, placing the location module into a sleep mode, awakening the location module upon receipt of a location transmission, and determining a location with the location module. These placing, awakening, and determining steps are repeated, thereby placing the application into a sleep mode when not needed, thereby reducing the drain on the mobile device. The application goes into sleep mode when necessary or when desired, such as when the application is not needed, e.g., during extended movement or upon an arrival at a location. In embodiments of the MPSM method and system of this invention, the application can go into sleep mode whenever a time since the device awakening exceeds a predetermined time allocation, or upon a determined rate of travel exceeding a predetermined threshold, thereby indicating extended travel.

Figure 10:
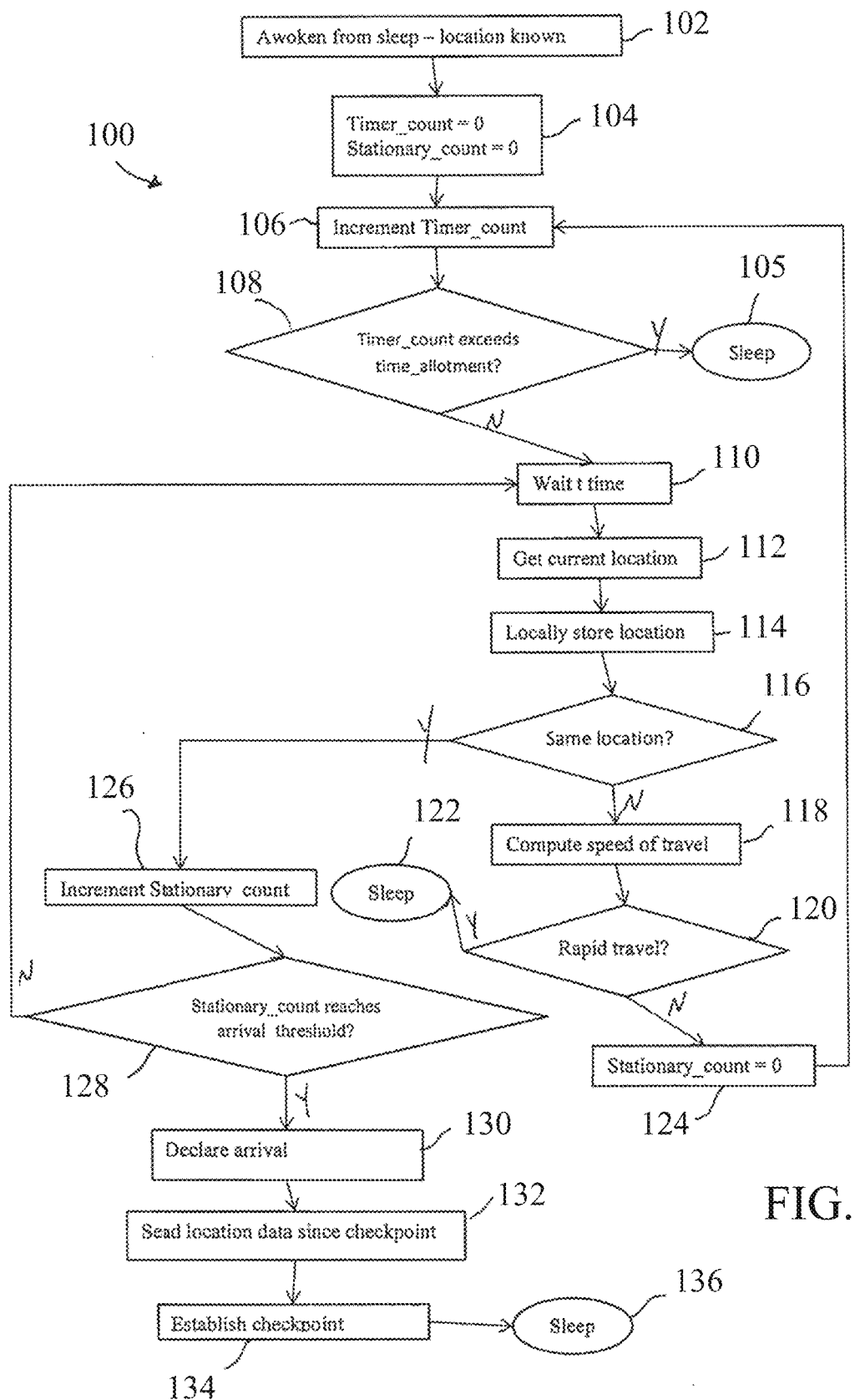
FIG. 10 illustrates the processing flow employed to identify an arrival according to one embodiment of this invention.

FIG. 10 illustrates one exemplary, and non-limiting, method according to an embodiment of this invention to automatically detect arrival at a destination. The method is useful for tracking a user's location for any of various reasons, including, for example, for safety, to provide automated reminders, and/or to provide automated suggestions to the user based upon the destination and/or surrounding area. The method of FIG. 10 is particularly useful for implementing the method and system discussed above, and can be used to implement other applications and method to provide energy savings compared to GPS location methods in mobile devices.

FIG. 10 includes a flow chart 100 that includes and/or represents three distinct situations, namely, an actual arrival, rapid movement, and sporadic movement without an actual arrival. Initially, the application is in sleep mode. Sleep mode is a state when no processing, and hence no energy consumption, takes place. Processing occurs once the application is awoken. A location transmission, such as a cell tower transmission or another application obtaining location information, awakens the application in step 102. Since the application awakening occurs due to a location transmission, the current location is known.

Once awakened, the application typically has a maximum amount of time to complete its processing. This limit, called time allotment, is set by the device operating system. All processing must complete prior to exceeding the time allotment. Ideally, the application should relinquish the processing flag back to the device operating system before the operating system forcefully removes the application from its active queue. Voluntarily terminating an application, namely returning it to the sleep mode, rather than having it forcefully terminated by the host operating system, is consider good citizenship. In step 104, the application initializes two timers, namely, a timer count representing the duration of time the process has executed since last awakening, and a stationary count representing the duration of time since the last detected device movement.

As time progresses and the process executes, the timer count is incremented in step 106. In one embodiment of this invention, whenever the application processing time exceeds the operating system time allocation (108-YES branch), the application is voluntarily placed in sleep mode 105. Note that the time allocation threshold is not necessary, but set to support good citizenship.

Assuming that the time limit has not been reached (108-NO branch), the application waits for t time units in step 110. After waiting t time units, new current location data are obtained is step 112 and stored locally on the device in step 114. In step 116, the current location is compared to the previously known location. If the two locations differ (116-NO branch), the rate of travel is computed in 118. If the rate of travel exceeds a threshold (120-YES branch), the process is desirably and voluntarily placed in sleep mode 122. Rapid travel is unlikely to result in an immediate or near term arrival; thus, checking locations while moving rapidly unnecessarily uses device energy. Eventually, the application process is awoken with the device moving at a slower rate. At that time, location checking is needed as an arrival might soon occur. If or when the rate of travel is slow (120-NO branch), movement is noted in step 124, and the loop is repeated commencing with the indication that additional processing time has elapsed in step 106.

Thus far, the arrival detection process has been voluntarily placed in sleep mode either due to having exceeded the self-imposed processing allotment quota which is desirably set just slightly below the operating system's time limit that leads to the removal of the application from the active queue (108-YES branch) or having travelled too rapidly (120-YES branch). Slow travel has resulted in simply recording the locations traveled, noting the movement exists in step 124, and awaiting either arrival or process termination.

Arrival is determined when the same location is detected for a sufficient duration of time. That is, an arrival is potentially determined when the location remains the same (116-YES branch). The stationary detection count is then incremented in step 126. If the stationary threshold is not yet exceeded (128-NO branch), the application waits for t time units in step 110, and the current location is obtained in step 112 and stored locally in step 114. A sufficient and predetermined duration at the same location eventually surpass the arrival detection threshold (128-YES Branch).

Once arrival is determined, arrival is declared in step 130, all data regarding the prior locations visited and stored locally are compressed and sent to the back end system supporting the application in step 132. A new location checkpoint is established in step 134, and the process is placed in sleep mode 136. From the sleep modes, the process of FIG. 10 repeats upon a known location.

Compression of location data is typically performed prior to local device to back-end system transmission as often the location data many not be needed at the back end. Location data may not be needed in cases, for example but not limited, during rapid travel. Although exemplified as having data compression occur prior to the sending of the data to the back-end, it is within the scope of this invention to compress location data prior to storing them locally.

All parameters described above for FIG. 10, for example t (for the time units), timer count, etc., are system and device dependent. Experimentation with and fine tuning of these and other parameters is within the scope of this invention. Also within the scope of this invention is the tuning of these and other parameters via the use of machine learning, data mining, and statistical approaches; supervised, semi-supervised, and unsupervised approaches can be used.

As discussed above, once the user has arrived at a destination, the location identification, user activities at the location, and/or any proximate third party members of the user's community are determined, if not already known. In this way, the devices automatically continually determine locations which can be used to identify any establishments and/or any community members at or within proximity to the location.

User activities are actions or events. Example user activities include but are not limited to "drinking wine," "flying," "reading," "attending conference," or "commuting." Users specify a particular user activity either by selecting from a provided list or by entering a different user activity. As discussed above, the provided list is generated by storing all previously entered user activities from all systems users but biasing the ranking of the provided activities based on context, the local user, their community, or a combination thereof.

All location and user activity pairs are stored in a database correlating the location with the activity. Any of the many database management systems or storage schemes known in the art can serve as the platform for this location-activity database. Furthermore, it is well understood in the art that the location-activity database can store many additional features. For example, the user identity and date and time of the pair are recorded.

Over time, the database grows and contains a sufficient number of pairs to support mining. The volume of data needed to mine correlations is dependent on the mining algorithm deployed and the level of accuracy needed. As known in the art, there are many machine learning, data mining, and statistical approaches to support mining. By using any of the many available such approaches, either individually or in combination, a local user activity preference per location is learned. Example learning approaches include supervised, semi-supervised, and unsupervised approaches including but not limited to Naïve Bayes, Neural Networks, Support Vector Machine, and Associating Mining based techniques. The use of proprietary mining techniques is likewise within the scope of this invention. Once local user preference is learned, this preference is used to bias the aforementioned provided user activity list.

There are many approaches to identify locations. Automated location identification is accomplished by periodic checking of the current location. Periodicity of checking depends on, for example, the method used to determine the location, the desired frequency of reporting, recording, and notification, and the resources available to support the checking. Other periodicity determination approaches known in the art can likewise be used. One approach to automate location identification is the periodic determination of lat-long pairs via the use of a GPS device. An online service or a locally resident database can be used to correlate the GPS readings with locations. A preferred embodiment of this invention uses the aforementioned location database. Whenever a transmission to a connected cell tower is made, the cell coordinates of the transmitting device are used as a search query against the location database. If a match is detected, that location is identified. Another preferred embodiment detects locations upon the crossing of geofence boundaries as previously discussed. Note that both dynamically determined geofence boundaries and static geofence boundaries detect a location. Yet another preferred embodiment detects locations by capitalizing on location transmissions generated by any other application operating on the mobile device requesting location information.

In embodiments of the MPSM method and system of this invention, local users, unless disabled by a local user, can be provided with automated notifications for themselves and for their community members. These notifications describe locations, activities, or correlated locations and activities for themselves and their community members. For example, unless disabled by the user, any time a user arrives at a new location, the local user and their communities can be notified of the user's new location. Automated location detection and notification, unless disabled, occurs without requiring a local user prompt.

Similarly, activity notification can be automated. Once a user arrives at a location, a set of activities previously occurring at that location is shared with the community or provided to the local user for information or sharing. If the user chooses to confirm at least one of these past activities, both the local user and their respective community members are notified of this at least one activity, and any photo taken is automatically tagged with the context information.

In another embodiment of this invention, automated notification involves shared experiences. A shared experience is one that associates multiple users. These associations can be passive or active. A passive association is strictly informative in nature while an active association requests an action. Non-limiting examples of passive shared experiences based on locations include: "User A is at User A's office, as is User B" and "User A is at home as is User C." Note that the first example involves multiple users at the same physical location, namely User A's office, while the second example involves multiple users at the same relative locations, namely their homes, but at different physical locations.

Similarly, passive shared experience notifications can be based on user activity. Non-limiting examples of passive shared experiences based on activity include: "User A is eating lunch as is User B" and "User A is participating in her favorite sport as is User B." Note that the first example involves multiple users participating in the same activity, namely eating lunch, while the second example involves multiple users involved in similar nature of activities, namely participating in their own favorite sport, which can be different actual activities, namely racquetball and swimming. In both passive shared experiences based on location and on activity, known in the art machine learning, data mining, and statistical approaches that are supervised, semi-supervised, or unsupervised approaches can be used to correlate relative locations and activities to physical locations and activities.

Other shared experiences can prompt for action, and are thus considered active. A non-limiting example of an active shared experience prompting for action includes: "User A posted a picture when at Penn Station; you are now at Penn Station; please post a better picture?" Thus, active shared experiences request the user to actively react. As above, active shared experiences can be location or activity based and can be absolute or relative. Note that it is likewise within the scope of this invention that individual user notifications be active and passive, in a similar manner as described above. However, the correlation of locations and activities both for passive and active are based strictly on the current, past, or projected expected activities of the individual user rather than those of multiple users.

Typically, only changed locations and activities are notified. That is, a location or activity is not typically repeatedly identified. However, a local user can request repetitive notifications based on any triggering condition known in the art.

Local users do not always remember to indicate a new location name or confirm which of the possible suggested name or names the system indicated for the given the location. As such, it is at times advantageous to prompt the local user for information. However, overly aggressive prompting might annoy the user. In embodiments of this invention, the application non-invasively prompts the user upon detecting an unknown location for the given local user. To avoid annoyance, prompting is repeated only rarely, say twice; the number of repeated prompts can be set as a parameter. Similarly, to provide a sense of comfort, if the back-end system recognizes the location based on the local user's community members' naming schemes, it prompts the local user with guiding messages, for example but not limited to "Many of your community members call this location The Tasting Room".

Identification of activities associated with a given location or a given community member can be additionally or alternatively automatically inferred in multiple ways. In embodiments of this invention, the computer system can automatically determine a positional destination of a user, such as by using a mobile device discussed herein, and automatically deduce as user information a location type and/or user activity of the positional destination. The user information can be deduced, at least in part, based upon the destination context. Exemplary context information includes, without limitation, time-dependent information (e.g., what time of day is it?), community information (e.g., who is also there?), and/or third-party information about the positional destination. This method, tied with automatic sharing of the user information in a social networking service, can provide a partially or fully automated process for determining user location and activity, and tagging photos taken with the context information.

In one embodiment of the MPSM method and system of this invention, the automatic deducing of the user information is based upon known or learned user routine. As discussed above, local users typically follow standard routines. Some routines are daily, weekly, monthly, etc. Other routines are context dependent. Regardless of the nature of the routine, learning via any of the many statistical, machine learning, data mining, or business analytical techniques known in the art, enables predictive behavior and automated activity and location suggestion. For example, but not limited to, if a local user always goes out to lunch at noon on every weekday, then if an unknown location is detected on a Tuesday at noon, then the application can suggest that this unknown location is likely a restaurant and the activity is likely eating lunch. Similarly, routine identification enables the prevention of transmissions both positional and informational. For example, but not limited to, if a local user always goes to sleep at midnight on Sunday through Thursday and awakens at 7:00 am the following day, then energy can be saved if the application voluntarily places itself in sleep mode during the hours that the local user is known to be sleeping. Additionally, routines can involve a sequence of activities and locations. A non-limiting example of a sequence of activities includes: On weekdays, Eric arrives at his office at 8:00 am, drinks coffee at 10:00, develops software from 11:00 am until 5:00 pm, commutes home at 5:30, and finally, arrives at home at 6:00 pm.

Another location and/or activity deduction approach is by association. The automated deducing can include automatically associating a user with a second user at a positional destination. If the second user's location and/or second user's activity is known, then the system can automatically infer the location type and/or user activity of the first user from the second user location and/or activity. Consider a previous known event such as: "Community member Sally swimming at the Somerset pool", assuming that the Somerset pool location was previously identified. As an example of automatically determining a current activity of community user Sam, the system identifies through location determination that Sam is currently at the same location as Sally, and also that Sally is currently at the Somerset pool. From this information, possible automatically postulated associations and activities are: "Sam is at the Somerset pool", "Sally is swimming", and "Sam is swimming". Thus, it is possible to infer an activity for a community member from association with another community member. It is within the scope of this invention to use any logical inference methods known in the art to generate plausible associations. It is also within the scope of this invention to obtain confirmation of the plausible postulated activity by the community member, in this case Sam, by asking either Sam or Sally or by any other means known in the art.

Desirably the computer system operating the MPSM automatically stores past user information, including past location type and/or user activity of the positional destinations of all users. User information for future visits to repeat positional destinations can be automatically deduced as a function of the stored past location type and/or user activity of the positional destination. In embodiments of this invention, the system can rely on recorded previous activities of a user, a community member, or any system user at a given location to postulate on a user's activity at a given location. Past context information for past visits to the positional destination by the user and/or community members of the user can be compared to a current context of the user's visit to the positional destination to deduce the user information. In one embodiment, the system can reduce possible location types and/or user activities as a function of the past location type and/or user activity of the positional destination.

As an example, at a given Location A, users previously studied, talked, ate, and drank. Thus, if a user's positional destination is detected as at Location A, then plausible activities postulated can be studying, talking, eating, and drinking. More so, if the given user's community members only previously talked, ate, and drank, it is with a higher probability to postulate that the given user is talking, eating, and drinking rather than studying. Furthermore, if the given user visited Location A previously, but only talked and drank, then an even higher probability is that the user is currently talking and drinking rather than eating and studying. It is within the scope of this invention to postulate some or all of the previously detected activities of a given location. More so, it is within the scope of this invention to rank order the activity suggestions according to the relevance of the previously visiting users to the given current user. As previously described, the system can request confirmation of suggested activities through the user's mobile device.

The system can additionally or alternatively reduce possible location types and/or user activities as a function of the past location type and/or user activity of the positional destination as a function of the time of day. The system can rank possible location types and/or user activities of the positional destination based upon known past time periods corresponding to the time of day of the current user visit. For example, again given Location A, if previous visiting users were recorded to study one or more times during the intervals: 3:00-4:30 PM and 7:30-9:00 PM, and to drink one or more times during the intervals: 4:00-7:00 PM and 8:30 PM-2:00 AM, then a current visiting user at Location A at 3:15 PM is likely studying, at 4:15 PM is likely to be either studying or drinking, and at 1:00 AM is likely to be drinking. More so, if the given user's community members only studied between 3:15-4:30 PM then it is with a higher probability to postulate that the given user is studying rather than drinking at 4:15 PM. Furthermore, if the given user visited Location A previously but only studied, then an even higher probability is that the user when at Location A is studying. It is within the scope of this invention to postulate some or all of the previously detected activities of a given location. More so, it is within the scope of this invention to rank order the activity suggestions according to the relevance of the previously visiting users to the given current user. As previously described, the system can request confirmation of suggested activities through the user's mobile device.

In embodiments of this invention, time context alone can be used to postulate activities. For example, if most days, a user is recorded to be drinking coffee between 9:00-10:00 AM, then, without contradictory information, a plausible activity postulate is that at 9:35, the user's activity is drinking coffee. Again, as previously disclosed, it is within the scope of this invention to rank order the postulated activity suggestions according to the relevance of the previous users to the given current user and/or to obtain confirmation of suggested activities.

Additionally, it is also within the scope of this invention to rank order the time postulates based on frequency of occurrence within the time interval. This rank ordering applies to both location based and location independent time based postulates. For example, if in the interval 4:00-4:30 PM, community members studied 25 times but drank 5 times then, at 4:15, it is with a higher probability to postulate that the given user is studying rather than drinking.

In embodiments of the MPSM method and system of this invention, the system can search and/or use, if available, external, third party information about the positional destination for postulating activities for a given location. For example, third party vendors might provide, either free of charge or for a fee, activity information for a given site. Consider a marketing website of a centralized homepage for a grocery store chain. Such websites are likely to contain addresses of many or all of the associated stores. Since these stores all support shopping, an activity associated with these locations is shopping. Similar information can be derived or purchased from other sources such as but not limited to commercial information repositories. Additionally, maps can be parsed. Given a location of a road, an activity of that location is likely to be driving Various and alternative third party information gathering approaches and their incorporation into activity classification and postulation can be incorporated into the method and system of this invention.

Suggested activity information, particularly but not limited to information obtained or derived from third party vendors, might be additive or might be contradictory. Thus, combining or reconciling potential activities is needed. The use of voting schemes, biased based on credibility of the source or on frequency, such as majority, or other known techniques, can be incorporated in the method and system of this invention. Note that differing suggested plausible activities may additive or may be contradictory. The use of techniques such as, but not limited to, conflict resolution methods, ontology determination, and clustering, etc., can be incorporated to recognize potential conflicts and to expand classification is within the scope of this invention.

Additionally, the classification of plausible activities based on activities occurring in the surrounding vicinity is likewise within the scope of this invention. For example, consider an unknown location adjacent to two known locations, such as, but not limited to, two neighboring stores or two neighboring beaches. For the neighboring stores, known activities might include shopping and strolling, while for the neighboring beaches, known activities might include sunbathing and swimming. Given location proximity, it is within the scope of this invention to suggest a user's activity at the unknown location to be either shopping and strolling or sunbathing and swimming, respectively. Confirmation can always be obtained for suggested activities and to bias suggested activities based on user familiarity and frequency of occurrence.

In embodiments of the MPSM method and system of this invention, local users can opt to delay their notifications. That is, once a location is visited or an activity occurs, a local user can opt to have the notification of the location or activity be delayed by some period of time. Delaying a notification provides the local user with the ability to notify their community of the location visit or activity occurrence, but still provides the local user time to progress to the next location or activity. As discussed above, users can also choose to automatically share or not share photos taken with the digital picture frames of this invention.

Notifications can be complemented with correlations with other community members. That is, both the local user and their respective community can be automatically notified with a comparison. A comparison, for example but not limited to, can identify other community members having previously conducted a specific activity or having visited a given location previously. Comparisons are made by checking other community member locations and activities against those of the local user. Checking is performed via a search of the location-activity database. If a match exists within a specified or predetermined period of time, a comparison notification is made automatically. The period of time can be arbitrarily set or can follow some logical time quantum such as hour, day, week, etc.

Locations and activities are known by name. However, in addition to a name, locations and activities can have associated personal labels. Labeling locations and activities can detail familiarity to the location and activity. User labels for locations can be surrogate names, for example, "favorite city" for Chicago, can be songs or sound waves, for example song words "my kind of town, Chicago is" for Chicago, can be a picture, for example "the Water Tower" for Chicago, can be a video, for example "a panoramic view of the Chicago skyline" for Chicago, or any combination of these and other multimedia tags supported by the local device. Similarly, user labels can exist for activities. For example, "favorite vice" for drinking wine, or it can be a song or sound wave, for example the song words "a bottle of red" for drinking wine, or it can be a picture, for example, a wine bottle picture for drinking wine, or it can be a video, for example "a panoramic view of a vineyard" for drinking wine, or any combination of these and other multimedia tagging labels supported by the local device.

In embodiments of the MPSM method and system of this invention, local users and community members can comment on their own and each other's locations and activities. Comments can take any of the many multimedia forms provided by the local device. These include, but are not limited to, text, sound, pictures, videos, or any combination thereof. Multiple comments can be made by the local user, their community, or combination thereof. In addition to stating their opinions (commenting), community members can prompt for clarification. That is, by issuing "what" comments, community members request additional information on the posted locations and activities. Additionally, user can "like" their own and each other's locations and activities. By "liking" a location or activity, community members express their satisfaction of their respective community members' presence in terms of location and activity. Multiple community members as well as the local user can "like" a location and activity.

The MPSM method and systems of this invention can track vast data on both the local user and their respective community members. These data cover, including but not limited to, locations, activities, and also individuals both who are system users and those who are not. These data can be stored and summarized. A summary of the local user and community member locations, activities, time durations involved in each of these locations and activities, individuals who they encountered, etc., can be computed and presented to the user. This summarization can range from simple statistical aggregation to advanced correlations as derived by any of the many, both individually and combined, machine learning, data mining, business analytics, and statistical techniques known in the art.

Information that can be aggregated or derived can answer, exemplary but not limiting, questions such as: how much time a local user spent doing things, such as, working at home, working out, walking the dog, commuting to work?; how much time a particular community member spent doing things, such as, working at home, working out, walking the dog, commuting to work? (Note that the information derived for the community member is based strictly on the information that that particular community member chose to share); who are the five most common individuals that a particular user interacts with?; what is the likelihood that after seeing a particular user, the given local user would see a particular different individual?; which activities and locations are most closely associated with each other and when are they most likely to occur?; which three users among a given community are most likely to visit a particular location together?

Local users can be provided with summaries of their locations, durations at these locations, and activities at these locations. Furthermore, at the discretion of the local user, these summaries are made available to their community members.

The system can also generate and maintain both aggregation and derived information. This information can be used to optimize suggestions to avoid obstacles, for example, but not limited to preferred routing of commuting path, promoted target advertising, for example but not limited to location of nearby ice cream store for those users who frequently record "eating ice cream" as an activity, and a host of other informational services known in the art.

The following examples illustrate, without limitation, the above discussed data capturing, storing, analyzing, mining, and presenting MPSM functionalities of this invention. It is to be understood that all changes that come within the spirit of the invention are desired to be protected and thus the invention is not to be construed as limited by these examples.

This invention further provides a means to rapidly display and review user photographs. In one embodiment, the device, such as through an executed application, includes and executes code instructions for providing rapid feedback in an ergonomically convenient, intuitive user interface. The code allows for displaying user photographs or other data in response to a plurality of user hand movements within a continuous user swipe on a mobile device screen. User hand movements are either captured via a touch screen or via gestures captured via the line of view of an included camera.

By a user interface method, referred to as the Ownbey-scrub, or "scrub" for short, a user can hold down an icon to select and swipe through a clustered collection of pictures representing activities that occur within a given time span, location, with specific other users, or any other clustering condition. Clustering of items can be accomplished in any of the many known in the art clustering techniques.

In embodiments of this invention, the scrub operates by placing a finger (and holding it) on an icon presented on a touch screen and scrubbing (without lifting off the screen) with that finger horizontally (left or right) or vertically (up or down). In response to the direction of the continuous finger contact/movement, quick feedback is provided to the user in the form of rapidly displayed pictures. Left or right and up or down represent forwards or backwards depending on user preference. User preference might differ due to any orientation (left or right handed) or any physical or logical conditions. By default, right to left and top to bottom is ascending order while left to right and bottom to top is descending order. Composition movements consisting of both vertical and horizontal can also be used. For example, a user might push and hold her/his thumb and scrub right to left, without lifting the hold, scrolling rapidly through her/his daily events from morning to night. Determination of direction of scrolling can be accomplished using any known in the art vector composition methods. Scaling the tracking of the scrub movement based on the number of pictures in the intended scroll and determining when such movement was performed can be done via any known in the art computations as used for such processing in the image analysis, graphics, and user interface domains. Additionally, it is within the scope of the invention to support voice activated commands that support similar scrub operations.

The invention further includes ranking the order the pictures are presented within each scrub, and/or ranking the order the presentation of the pictograms associated with each user. Rank ordering can be based on any of the many ordering criteria disclosed herein and/or known in the art including but not limited to chronological time associated with the set of activities, location of the activities ordered based on bias of locations, proximity to other users-either a specific user or any users within a user's community, proximity to a location where the last photograph was taken, and so forth.

Thus, the invention provides a digital picture frame including a camera connected to the frame, and a network connection module for use as a device for displaying pictures from a user's electronic device and/or social media account or her or his community members' social media accounts. The frame allows for efficient, automated access to photos relevant to the viewer(s) of the frame. The automated frame allows for changing photos for the viewer(s) without multiple manual steps, and for identifying and/or displaying two or more related photos for simultaneous split-screen display.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of displaying digital photos on a digital picture frame with a digital display screen and a network connection module, the method comprising:
   connecting to a first interaction application of a first electronic device of a first user through the network connection module, the first electronic device including a first digital photo collection;
   connecting to a second interaction application of a second electronic device of a second user through the network connection module, the second electronic device including a second digital photo collection;
   automatically identifying and selecting two different photos that include a matching photo content from the first and/or the second selected digital photo clusters; and
   displaying the two different photos simultaneously on the digital display screen, each in one of two equal screen sections of the digital display screen, wherein a first of the two different photos is in a first of the two equal screen sections, and a second of the two different photos is in an adjacent second of the two equal screen sections;
   wherein the matching photo content is a same person or persons, the two different photos are photographically captured in two different calendar years, the two different calendar years are separated by more than one additional calendar year, and further comprising:
   automatically clustering from the first digital photo collection, via automated facial recognition, photos over a multi-year timeframe of the person to obtain clustered photos of the person, wherein the clustering comprises:
   preparing a plurality of sub-clusters each including digital photos of the person at a similar time and/or age;
   extracting photo facial features within each of the plurality of sub-clusters that comprise a predetermined limited change over the timeframe to form a cluster representation of the person for each of the plurality of sub-clusters;

comparing cluster representations between the plurality of sub-clusters to determine related sub-clusters of the person over the timeframe as a function of the cluster representations;

linking or grouping related sub-clusters to form the clustered photos of the person for display; and automatically selecting a first of the two different photos from a first of the sub-clusters and a second of the two different photos from the second of the sub-clusters.

2. The method of claim 1, wherein the first of the two different photos is a baby photo of a person in a first calendar year and the second of the two different photos is of the person at another age separated by the more than one additional calendar year; and further comprising:

changing the second of the of the two different photos with a slideshow of the person at other ages, wherein the baby photo is not changed on the first of the two equal sections.

3. The method of claim 1, wherein each of the two different photos further includes one of two different second persons, wherein the different second persons are related family members.

4. The method of claim 3, wherein the two different photos are automatically downloaded from one or more digital photo collections of the two different second persons.

5. The method of claim 1, further comprising:

filtering each of the sub-clusters as a function of quality, wherein photos of a predetermined low quality are removed from the sub-clusters; and filtering the each of the sub-clusters as a function of a further content, wherein photos including predetermined people, activities and/or locations are removed from the sub-clusters.

6. The method of claim 1, wherein the two different photos are displayed in a slideshow of digital photos on the digital display screen, wherein a plurality of displayed slideshow photos is automatically downloaded from electronic devices and/or social media accounts of a plurality of community members.

7. The method of claim 1, wherein the digital picture frame automatically determines an identity of a viewer of the digital picture frame as the first user.

8. The method of claim 1, further comprising:

automatically identifying preferred photos or restricted photos in the sub-clusters as a function of user information.

9. The method of claim 7, further comprising:

detecting an electronic device of the viewer in proximity to the digital picture frame; and automatically scanning and clustering digital photos of the electronic device.

* * * * *